United States Patent [19]
Nishimoto et al.

[11] Patent Number: 5,970,203
[45] Date of Patent: Oct. 19, 1999

[54] VIDEO SIGNAL RECORDING APPARATUS

[75] Inventors: Naomichi Nishimoto, Tokyo; Masahiro Hirasawa, Yamato; Takeo Murayama; Tomoaki Suzuki, both of Tokyo, all of Japan

[73] Assignee: Victor Company of Japan, Ltd., Yokohama, Japan

[21] Appl. No.: 09/086,349

[22] Filed: May 29, 1998

Related U.S. Application Data

[62] Division of application No. 08/968,862, Nov. 5, 1997, Pat. No. 5,809,200, which is a continuation of application No. 08/611,740, Mar. 6, 1996, abandoned.

[30] Foreign Application Priority Data

Aug. 7, 1995 [JP] Japan ................................. 7-221010

[51] Int. Cl.$^6$ ................................. H04N 5/91; H04N 7/00
[52] U.S. Cl. ................................. 386/46; 386/35; 386/112; 348/152; 348/155
[58] Field of Search ................................. 386/35, 33, 25, 386/46, 109, 112; 348/152, 154, 155, 419, 405, 700

[56] References Cited

U.S. PATENT DOCUMENTS

| | | |
|---|---|---|
| 4,774,570 | 9/1988 | Araki ................................. 358/108 |
| 5,111,291 | 5/1992 | Erickson et al. ................................. 358/108 |
| 5,151,945 | 9/1992 | Lee et al. ................................. 382/1 |
| 5,272,527 | 12/1993 | Watanabe ................................. 358/108 |
| 5,339,104 | 8/1994 | Hong ................................. 348/155 |
| 5,471,239 | 11/1995 | Hill et al. ................................. 348/155 |
| 5,489,943 | 2/1996 | Kutner ................................. 348/405 |
| 5,515,105 | 5/1996 | Lim ................................. 348/405 |
| 5,570,199 | 10/1996 | Tanaka et al. ................................. 386/95 |

Primary Examiner—Wendy Garber
Assistant Examiner—Vincent F. Boccio
Attorney, Agent, or Firm—Louis Woo

[57] ABSTRACT

In a video signal recording apparatus, a first video signal is compressed into a second video signal in response to a controllable quantization factor which determines a degree of the compression. The quantization factor is controlled to maintain a data rate of the second video signal at substantially a constant rate. A detection is made as to a magnitude of the quantization factor. A decision is made as to whether or not the detected magnitude is greater than a predetermined reference magnitude. The second video signal is recorded on a recording medium when the detected magnitude is greater than the predetermined reference magnitude.

1 Claim, 16 Drawing Sheets

VIDEO SIGNAL RECORDING APPARATUS

This application is a division of Ser. No. 08/968,862, filed Nov. 5, 1997, U.S. Pat. No. 5,809,200, which is a continuation of Ser. No. 08/611,740, filed Mar. 6, 1996, now abandoned.

BACKGROUND OF THE INVENTION

1. Field of the Invention

This invention relates to a video signal recording apparatus.

2. Description of the Prior Art

In general, traffic-condition monitoring systems, production-line monitoring systems in factories, and other monitoring systems include television cameras for converting scenes of interest into corresponding video signals. In some cases, the video signals generated by the television cameras are recorded by video tape recorders VTR's). It is desirable that such a VTR can continuously record a video signal for a long time.

Ordinary VTR's are capable of continuously recording video signals for 6 hours to 8 hours. There are known time-lapse VTR's which intermittently execute recording for 24 hours.

SUMMARY OF THE INVENTION

It is an object of this invention to provide an improved video signal recording apparatus.

A first aspect of this invention provides a video signal recording apparatus comprising first means for quantizing a first video signal into a second video signal in response to a controllable quantization factor; second means for controlling the quantization factor; third means for detecting a magnitude of the quantization factor; a recording medium; fourth means for recording the second video signal on the recording medium; and fifth means for controlling said recording of the second video signal by the fourth means in response to the magnitude detected by the third means.

A second aspect of this invention provides a video signal recording apparatus comprising first means for compressing a first video signal into a second video signal in response to a controllable quantization factor which determines a degree of said compressing; second means for controlling the quantization factor to maintain a data rate of the second video signal at substantially a constant rate; third means for detecting a magnitude of the quantization factor; fourth means for deciding whether or not the detected magnitude is greater than a predetermined reference magnitude; a recording medium; and fifth means for recording the second video signal on the recording medium when the fourth means decides that the detected magnitude is greater than the predetermined reference magnitude.

A third aspect of this invention provides a video signal recording apparatus comprising first means for compressing a first video signal into a second video signal in response to a controllable quantization factor which determines a degree of said compressing; second means for controlling the quantization factor to maintain a data rate of the second video signal at substantially a constant rate; third means for detecting a rate of a time-domain variation in the quantization factor; fourth means for deciding whether or not the detected rate of the time-domain variation is greater than a reference rate; a recording medium; and fifth means for recording the second video signal on the recording medium when the fourth means decides that the detected rate of the time-domain variation is greater than the reference rate.

A fourth aspect of this invention is based on the third aspect thereof, and provides a video signal recording apparatus wherein the third means and the fourth means comprise means for detecting first values of the quantization factor which occur at respective moments spaced by first equal intervals, means for calculating a first average among the first values, means for detecting second values of the quantization factor which occur at respective moments spaced by second equal intervals longer than the first equal intervals, means for calculating a second average among the second values, and means for deciding whether or not the detected rate of the time-domain variation is greater than the reference rate in response to a relation between the first average value and the second average value.

A fifth aspect of this invention provides a video signal recording apparatus comprising first means for compressing a first video signal into a second video signal in response to a fixed quantization factor which determines a degree of said compressing; second means for detecting a rate of a time-domain variation in a data rate of the second video signal; third means for deciding whether or not the detected rate of the time-domain variation is greater than a reference rate; a recording medium; and fourth means for recording the second video signal on the recording medium when the third means decides that the detected rate of the time-domain variation is greater than the reference rate.

A sixth aspect of this invention is based on the fifth aspect thereof, and provides a video signal recording apparatus wherein the second means and the third means comprise means for detecting first values of the data rate which occur at respective moments spaced by first equal intervals, means for calculating a first average among the first values, means for detecting second values of the data rate which occur at respective moments spaced by second equal intervals longer than the first equal intervals, means for calculating a second average among the second values, and means for deciding whether or not the detected rate of the time-domain variation is greater than the reference rate in response to a relation between the first average value and the second average value.

A seventh aspect of this invention is based on the third aspect thereof, and provides a video signal recording apparatus further comprising sixth means for intermittently recording the second video signal on the recording medium while the fourth means continues to decide that the detected rate of the time-domain variation is not greater than the reference rate.

An eighth aspect of this invention provides a video signal recording apparatus comprising first means for quantizing a first video signal into a second video signal in response to a controllable quantization factor; second means for controlling the quantization factor; third means for detecting a time-domain variation in the quantization factor; a recording medium; fourth means for recording the second video signal on the recording medium; and fifth means for controlling said recording of the second video signal by the fourth means in response to the time-domain variation detected by the third means.

A ninth aspect of this invention provides a video signal recording apparatus comprising first means for compressing a first video signal into a second video signal by signal processing which includes signal quantization; second means for thinning out the second video signal into a third video signal in unit of field or frame; a recording medium; and third means for recording the third video signal on the recording medium.

DESCRIPTION OF THE PREFERRED EMBODIMENTS

First Embodiment

Figure 1:
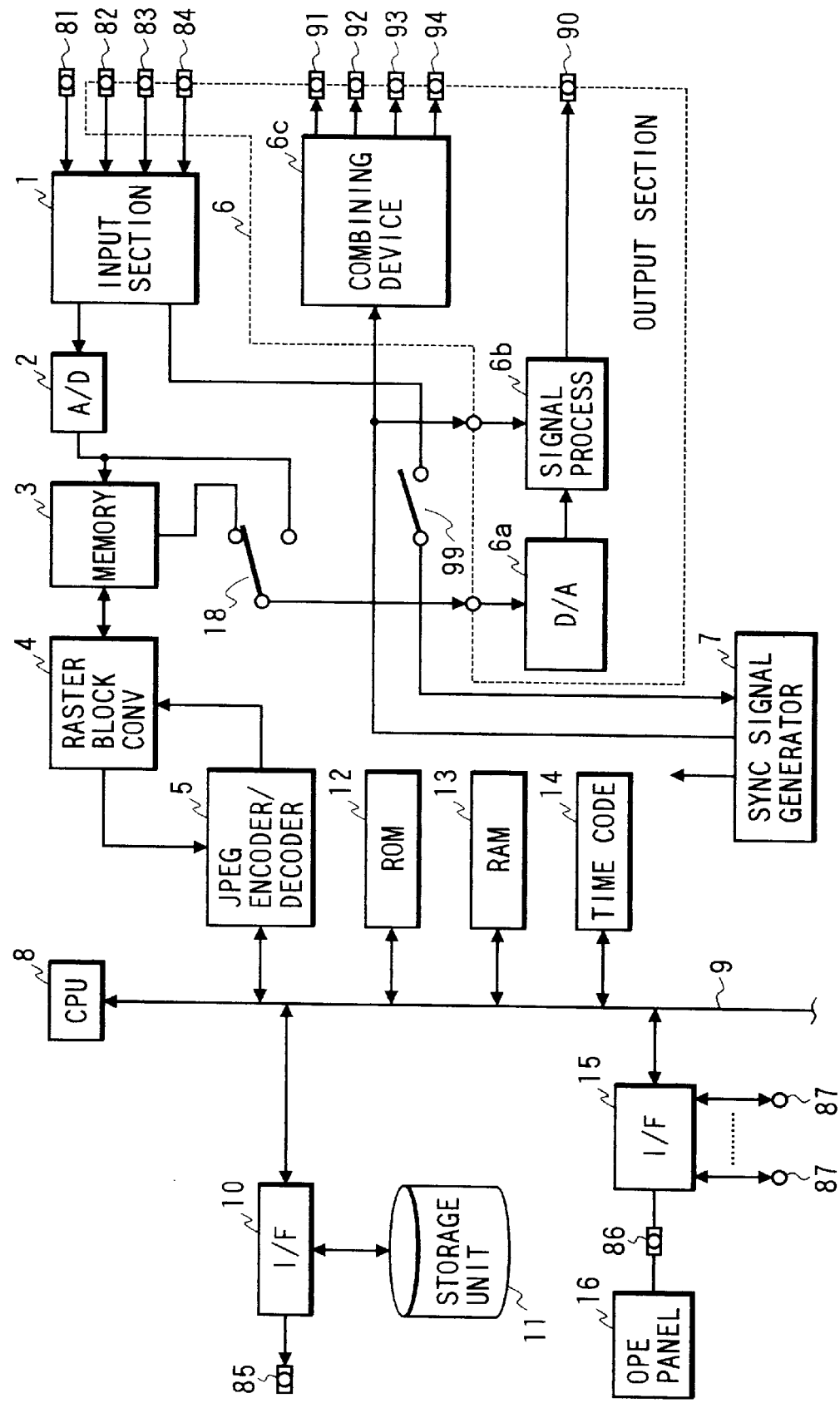
FIG. 1 is a block diagram of a video signal recording and reproducing apparatus according to a first embodiment of this invention.

With reference to FIG. 1, a video signal recording and reproducing apparatus includes input terminals 81, 82, 83, and 84 followed by an input section 1. Four different video signals can be applied to the input section 1 via the input terminals 81, 82, 83, and 84 respectively. A composite video signal and a set of a luminance signal (a Y signal) and a chrominance signal (a C signal) can be transmitted to the input section 1 via each of the input terminals 81, 82, 83, and 84. The input section 1 can handle either an input composite video signal or a set of input Y and C signals.

In an exemplary case where television cameras (not shown) are connected to the input terminals 81, 82, 83, and 84 respectively, video signals generated by the television cameras are transmitted to the input section 1 via the respective input terminals 81, 82, 83. and 84.

The input section 1 selects one of input video signals fed via the respective input terminals 81, 82, 83, and 84, and separates the selected input video signal into a set of an analog Y signal and analog color difference signals R-Y and B-Y. The input section 1 outputs the analog Y signal and the analog color difference signals R-Y and B-Y to A/D converters 2. It should be noted that the input section 1 may sequentially and cyclically select one of the input video signals at a given selection change period equal to, for example, an even natural number times the period of vertical sync components of the input video signals. Alternatively, the input section 1 may continuously select one of the input video signals in the absence of a selection change requirement.

The input section 1 is connected to a sync signal generator 7 via a switch 99. When the switch 99 is closed (when the switch 99 is in an on state), the analog Y signal can be transmitted from the input section 1 to the sync signal generator 7. When the switch 99 is opened (when the switch 99 is in an off state), the transmission of the analog Y signal from the input section 1 to the sync signal generator 7 is inhibited.

The A/D converters 2 change the analog Y signal and the analog color difference signals R-Y and B-Y into a corresponding digital Y signal and corresponding digital color difference signals R-Y and B-Y respectively. During the A/D conversions, the A/D converters 2 periodically sample the analog Y signal and the analog color difference signals R-Y and B-Y in response to a sampling clock signal synchronized with the selected input video signal. A signal 3fsc fed from the sync signal generator 7 is used as the sampling clock signal. The A/D converters 2 output the digital Y signal and the digital color difference signals R-Y and B-Y to a memory 3 and a switch 18. The digital Y signal and the digital color difference signals R-Y and B-Y outputted from the A/D converters 2 are referred to as the first digital Y signal and the first digital color difference signals R-Y and B-Y.

During a compression recording mode of operation of the apparatus of FIG. 1, time segments of the first digital Y signal and the X first digital color difference signals R-Y and B-Y which correspond to every frame are written into the memory 3. In other words, 1-frame segments of the first video information are successively written into the memory 3. The signal 3fsc fed from the sync signal generator 7 is used as a clock signal for determining a timing of access to the memory 3.

During the compression recording mode of operation of the apparatus of FIG. 1, a raster block converter 4 accesses the memory 3 to divide every 1-frame segment of the video information into a given number of blocks each corresponding to neighboring 8 by 8 pixels. Specifically, during every 1-block period, the raster block converter 4 sequentially reads out pieces of each of the first digital Y signal and the first digital color difference signals R-Y and B-Y, which correspond to neighboring 8 by 8 pixels, from the memory 3. The raster block converter 4 outputs the 1-block segment of each of the first digital Y signal and the first digital color difference signals R-Y and B-Y to a JPEG encoder/decoder 5. In this way, the combination of the memory 3 and the raster block converter 4 rearranges the first digital Y signal and the first digital color difference signals R-Y and B-Y into a second digital Y signal and second digital color difference signals R-Y and B-Y. The raster block converter 4 outputs the second digital Y signal and the second digital color difference signals R-Y and B-Y to the JPEG encoder/decoder 5.

During the compression recording mode of operation of the apparatus of FIG. 1, the JPEG encoder/decoder 5 receives the msecond digital Y signal and the second digital color difference signals R-Y and B-Y from the raster block converter 4, and processes each of the second digital Y signal and the second digital color difference signals R-Y and B-Y block by block. Specifically, the JPEG encoder/decoder 5 compresses and encodes the second digital Y signal and the second digital color difference signals R-Y and B-Y into a third digital Y signal and third digital color difference signals R-Y and B-Y of a given code according to the picture compressing algorithm or the signal processing algorithm of the JPEG standards.

The JPEG encoder/decoder 5, a CPU 8, an interface 10, a ROM 12, a RAM 13, a time code generator 14, and an interface 15 are connected to a bus line 9. The interface 10 is connected to a storage unit 11 and an output terminal 85. The storage unit 11 includes, for example, a combination of a disk drive and a magnetic optical disk or a combination of a disk drive and a magnetic disk. The interface 15 is connected to terminals 87. Signals can be transmitted to and from the interface 15 via the terminals 87. The interface 15 can also be connected via a connection terminal 86 to an operation panel 16. The CPU 8 operates in accordance with a program stored in the ROM 12. The CPU 8 provides a work area in the RAM 13. The time code generator 14 produces time information.

During the compression recording mode of operation of the apparatus of FIG. 1, the CPU 8 controls the JPEG encoder/decoder 5 so that the third digital Y signal and the third digital color difference signals R-Y and B-Y of the given code are outputted from the JPEG encoder/decoder 5 to the bus line 9. Subsequently, the third digital Y signal and the third digital color signals R-Y and B-Y of the given code are transmitted to the interface 10 via the bus line 9, or transmitted to and stored into the RAM 13 via the bus line 9 before being transferred from the RAM 13 to the interface 10 via the bus line 9. Then, the third digital Y signal and the third digital color difference signals R-Y and B-Y of the given code are fed from the interface 10 to the storage unit 11 before being stored into the recording medium within the storage unit 11. The third digital Y signal and the third digital color difference signals R-Y and B-Y of the given code can be transmitted from the interface 10 to an external device via the output terminal 85.

During a playback mode of operation of the apparatus of FIG. 1, the interface 10 and the storage unit 11 are controlled by the CPU 8 so that a digital Y signal and digital color difference signals R-Y and B-Y of the given code are transmitted from the recording medium within the storage unit 11 to the JPEG encoder/decoder 5 via the interface 10 and the bus line 9. It should be noted that the digital Y signal and the digital color difference signals R-Y and B-Y of the given code may be transmitted from the recording medium within the storage unit 11 to an external device via the interface 10 and the output terminal 85. The JPEG encoder/decoder 5 expands and decodes the digital Y signal and the digital color difference signals R-Y and B-Y of the given code into a decoding-resultant digital Y signal and decoding-resultant digital color difference signals R-Y and B-Y according to the picture expanding algorithm inverse with respect to the previously-indicated picture compressing algorithm of the JPEG standards. The JPEG encoder/decoder 5 outputs each of the decoding-resultant digital Y signal and the decoding-resultant digital color difference signals R-Y and B-Y to the raster block converter 4 block by block.

During every 1-block period, the raster block converter 4 sequentially writes pieces of each of the decoding-resultant digital Y signal and the decoding-resultant digital color difference signals R-Y and B-Y, which correspond to neighboring 8 by 8 pixels, into corresponding-address storage segments of the memory 3. Thus, during every 1-frame period, 1-frame segments of the decoding-resultant digital Y signal and the decoding-resultant digital color difference signals R-Y and B-Y are provided in the memory 3.

During the playback mode of operation of the apparatus of FIG. 1, pieces of the decoding-resultant digital Y signal and the decoding-resultant digital color difference signals R-Y and B-Y are sequentially read out from the memory 3 in a given order corresponding to the normal scanning direction, and are then fed via the switch 18 to D/A converters 6a within an output section 6. The signal 3fsc fed from the sync signal generator 7 is used as a clock signal for determining a timing of access to the memory 3.

The D/A converters 6a change the decoding-resultant digital Y signal and the decoding-resultant digital color difference signals R-Y and B-Y into a corresponding analog Y signal and corresponding analog color difference signals R-Y and B-Y. The D/A converters 6a output the analog Y signal and the analog color difference signals R-Y and B-Y to a signal processor 6b within the output section 6.

During the playback mode of operation of the apparatus of FIG. 1, the sync signal generator 7 produces a horizontal sync signal and a vertical sync signal which relate to the analog Y signal and the analog color difference signals R-Y and B-Y outputted from the D/A converters 6a. In addition, the sync signal generator 7 produces a signal 3fsc having a frequency equal to three times the frequency of a color subcarrier related to the analog Y signal and the analog color difference signals R-Y and B-Y outputted from the D/A converters 6a. The sync signal generator 7 outputs the horizontal sync signal and the vertical sync signal to the signal processor 6b and a combining device 6c within the output section 6. The sync signal generator 7 outputs the signal 3fsc to the A/D converters 2, the memory 3, the signal processor 6b, and the combining device 6c.

During the playback mode of operation of the apparatus of FIG. 1, the signal processor 6b receives the analog Y signal and the analog color difference signals R-Y and B-Y from the D/A converters 6a. In addition, the signal processor 6b receives the horizontal sync signal and the vertical sync signal from the sync signal generator 7. The signal processor 6b modulates the analog color difference signals R-Y and B-Y, thereby generating a chrominance signal. The signal processor 6b combines or multiplexes the analog Y signal, the chrominance signal, the horizontal sync signal, and the vertical sync signal into a composite video signal of the NTSC format. The signal processor 6b applies the NTSC composite video signal to an output terminal 90. The NTSC composite video signal can be transmitted to an external device via the output terminal 90.

During the playback mode of operation of the apparatus of FIG. 1, the combining device 6c receives the horizontal sync signal, the vertical sync signal, and the signal 3fsc from the sync signal generator 7. The combining device 6c has one input side leading from the sync signal generator 7, and four output sides leading to output terminals 91, 92, 93, and 94 respectively. The combining device 6c mixes the horizontal sync signal, the vertical sync signal, and the signal 3fsc into a composite sync signal corresponding to a black burst signal. The combining device 6c applies the composite sync signal to all the output terminals 91, 92, 93, and 94. The composite sync signal can be further transmitted to external devices via the output terminals 91, 92, 93, and 94.

During a non-recording mode of operation of the apparatus of FIG. 1, the switch 18 disconnects the D/A converters 6a from the memory 3 and connects the D/A converters 6a to the A/D converters 2. Accordingly, the D/A converters 6a receive the digital Y signal and the digital color difference signals R-Y and B-Y from the A/D converters 2. The D/A converters 6a change the digital Y signal and the digital color difference signals R-Y and B-Y into a corresponding analog Y signal and corresponding analog color difference signals R-Y and B-Y. The D/A converters 6a output the analog Y signal and the analog color difference signals R-Y and B-Y to the signal processor 6b.

During the non-recording mode of operation of the apparatus of FIG. 1, the sync signal generator 7 produces a horizontal sync signal and a vertical sync signal which relate to the analog Y signal and the analog color difference signals R-Y and B-Y outputted from the D/A converters 6a. In addition, the sync signal generator 7 produces a signal 3fsc having a frequency equal to three times the frequency of a color subcarrier related to the analog Y signal and the analog color difference signals R-Y and B-Y outputted from the D/A converters 6a. The sync signal generator 7 outputs the horizontal sync signal and the vertical sync signal to the signal processor 6b and the combining device 6c. The sync signal generator 7 outputs the signal 3fsc to the A/D converters 2, the signal processor 6b, and the combining device 6c.

During the non-recording mode of operation of the apparatus of FIG. 1, the signal processor 6b receives the analog Y signal and the analog color difference signals R-Y and B-Y from the D/A converters 6a. In addition, the signal processor 6b receives the horizontal sync signal and the vertical sync signal from the sync signal generator 7. The signal processor 6b modulates the analog color difference signals R-Y and B-Y, thereby generating a chrominance signal. The signal processor 6b combines or multiplexes the analog Y signal, the chrominance signal, the horizontal sync signal, and the vertical sync signal into a composite video signal of the NTSC format. The signal processor 6b applies the NTSC composite video signal to the output terminal 90. The NTSC composite video signal can be transmitted to an external device via the output terminal 90.

During the non-recording mode of operation of the apparatus of FIG. 1, the combining device 6c receives the horizontal sync signal, the vertical sync signal, and the signal 3fsc from the sync signal generator 7. The combining device 6c mixes the horizontal sync signal, the vertical sync signal, and the signal 3fsc into a composite sync signal corresponding to a black burst signal. The combining device 6c applies the composite sync signal to all the output terminals 91, 92, 93, and 94. The composite sync signal can be further transmitted to external devices via the output terminals 91, 92, 93, and 94.

The output section 6 includes the D/A converters 6a, the signal processor 6b, the combining device 6c, the input terminals 82, 83, and 84, and the output terminals 90, 91, 92, 93, and 94. It should be noted that the output section 6 may be omitted from the apparatus of FIG. 1.

Figure 2:
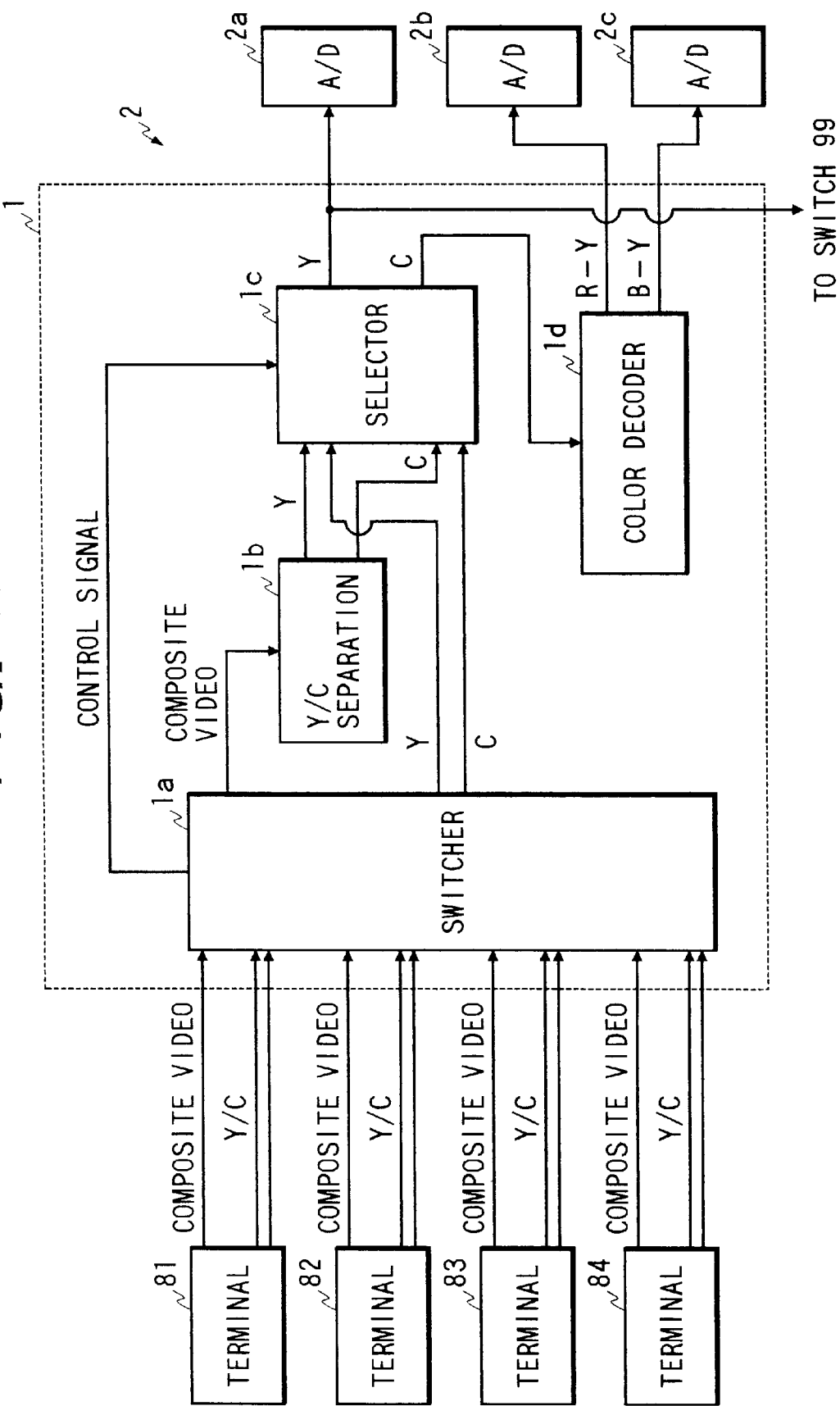
FIG. 2 is a block diagram of an input section in FIG. 1.

As shown in FIG. 2, the input section 1 includes a switcher 1a, a Y/C separating device 1b, a selector 1c, and a color decoder 1d. The switcher 1a is connected to the input terminals 81, 82, 83, and 84. The switcher 1a is also connected to the Y/C separating device 1b and the selector 1c. The selector 1c is connected to the color decoder 1d and an A/D converter 2a. The color decoder 1d is connected to A/D converters 2b and 2c. The A/D converters 2a, 2b, and 2c are included in the A/D converters 2.

Four different video signals can be applied to the switcher 1a via the input terminals 81, 82, 83, and 84 respectively. A composite video signal and a set of a luminance signal (a Y signal) and a chrominance signal (a C signal) can be transmitted to the switcher 1a via each of the input terminals 81, 82, 83, and 84. The switcher 1a selects one of input video signals fed via the respective input terminals 81, 82, 83, and 84, and transmits the selected input video signal to the Y/C separating device 1b or the selector 1c. Specifically, the switcher 1a transmits a composite video signal in the selected input video signal to the Y/C separating device 1b. The switcher 1a transmits a set of a Y signal and a C signal in the selected input video signal to the selector 1c.

The Y/C separating device 1b can receive the composite video signal from the switcher 1a, and separates the composite video signal into a Y signal and a C signal. The Y/C separating device 1b outputs a set of the Y signal and the C signal to the selector 1c.

The switcher 1a has a section which generates a control signal depending on whether the selected input video signal has only a composite video signal, only a set of a Y signal and a C signal, or both a composite video signal and a set of a Y signal and a C signal. The switcher 1a outputs the generated control signal to the selector 1c.

The selector 1c can receive a set of a Y signal and a C signal from the switcher 1a. Also, the selector 1c can receive a set of a Y signal and a C signal from the Y/C separating device 1b. The selector 1c responds to the control signal outputted from the switcher 1a. As previously described, the control signal depends on whether the selected input video signal has only a composite video signal, only a set of a Y signal and a C signal, or both a composite video signal and a set of a Y signal and a C signal. Accordingly, the selector 1c is controlled in response to whether the selected input video signal has only a composite video signal, only a set of a Y signal and a C signal, or both a composite video signal and a set of a Y signal and a C signal. When the selected input video signal has only a composite video signal, the selector 1c transmits a Y signal and a C signal from the Y/C separating device 1b to the A/D converter 2a and the color decoder 1d respectively. When the selected input video signal has only a set of a Y signal and a C signal, the selector 1c transmits a Y signal and a C signal from the switcher 1a to the A/D converter 2a and the color decoder 1d respectively. When the selected input video signal has both a composite video signal and a set of a Y signal and a C signal, the selector 1c rejects a Y signal and a C signal outputted from the Y/C separating device 1b and transmits a Y signal and a C signal from the switcher 1a to the A/D converter 2a and the color decoder 1d respectively.

The color decoder 1d receives the C signal from the selector 1c. The color decoder 1d demodulates the received C signal into color difference signals R-Y and B-Y. The color decoder 1d outputs the color difference signals R-Y and B-Y to the A/D converters 2b and 2c respectively.

The selector 1c is connected to the switch 99 (see FIG. 1). The Y signal outputted from the selector 1c is applied to the switch 99 (see FIG. 1).

Figure 3:
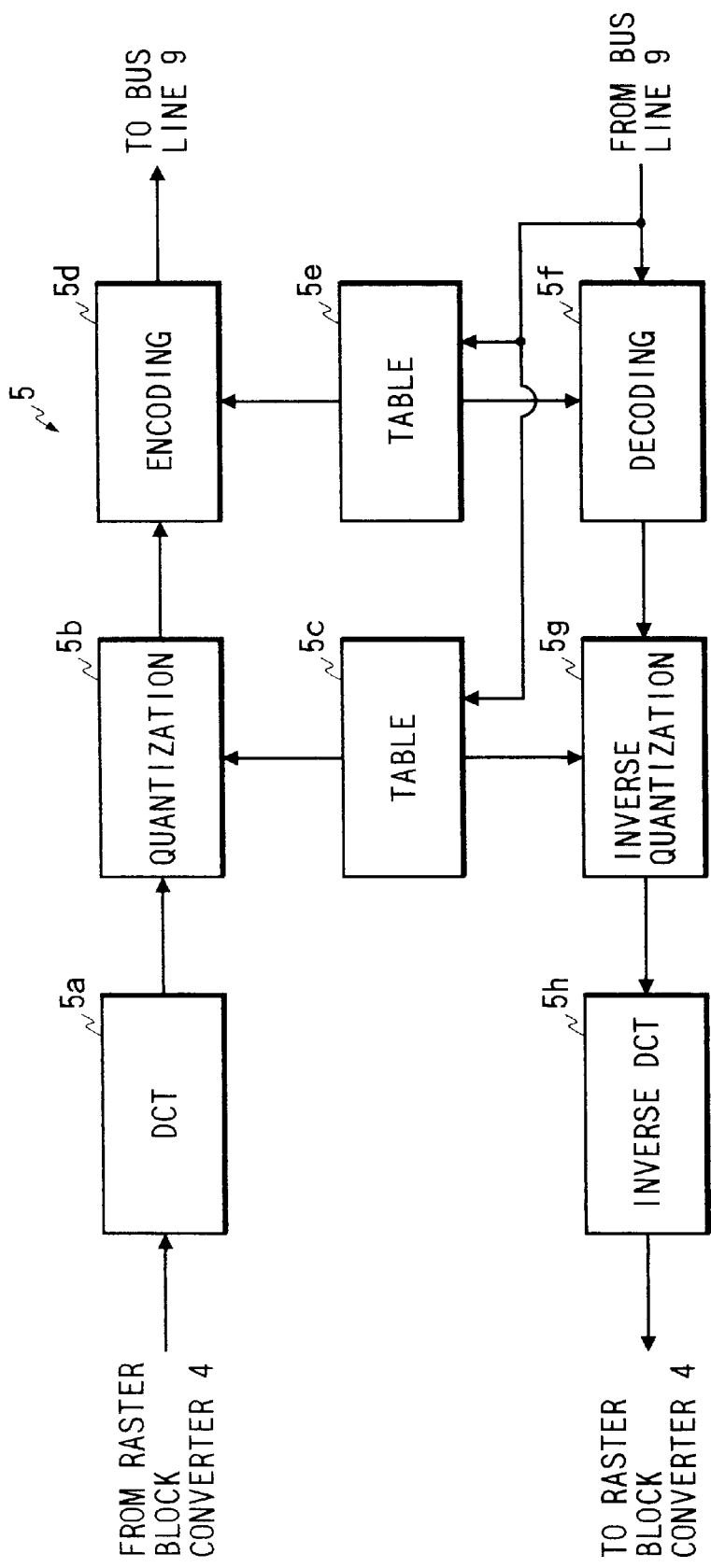
FIG. 3 is a diagram of a JPEG encoder/decoder in FIG. 1.

With reference to FIG. 3, the JPEG encoder/decoder 5 has a DCT (discrete cosine transform) section 5a, a quantizing section 5b, a quantization table 5c, an encoding section 5d, an encoding table 5e, a decoding section 5f, an inversely quantizing section 5g, and an inverse DCT section 5h. During the compression recording mode of operation of the apparatus of FIG. 1, the DCT section 5a receives the digital Y signal and the digital color difference signals R-Y and B-Y from the raster block converter 4. The DCT section 5a is successively followed by the quantizing section 5b and the encoding section 5d. A signal generated by the encoding section 5d is outputted to the bus line 9. During the playback mode of operation of the apparatus of FIG. 1, the decoding section 5f receives a signal from the bus line 9. The decoding section 5f is successively followed by the inversely quantizing section 5g and the inverse DCT section 5h. A signal generated by the inverse DCT section 5h is outputted to the raster block converter 4. The quantization table 5c is connected to the quantizing section 5b and the inversely quantizing section 5g. The encoding table 5e is connected to the encoding section 5d and the decoding section 5f. The quantization table 5c and the encoding table 5e are connected to the bus line 9.

As previously described, the JPEG encoder/decoder 5 processes each of the digital Y signal and the digital color difference signals R-Y and B-Y block by block. During the compression recording mode of operation of the apparatus of FIG. 1, the DCT section 5a subjects every 1-block segment of the output signal of the raster block converter 4 to discrete cosine transform, and thereby converts the 1-block segment into data representing a matrix of 8 by 8 DCT coefficients. The DCT section 5a informs the quantizing section 5b of the DCT coefficient data.

The quantization table 5c stores data representing 8 by 8 basic quantization step sizes (8 by 8 basic quantization table values) which correspond to the respective element positions within the DCT coefficient matrix respectively. In general, different basic quantization step sizes are assigned to the 8 by 8 DCT coefficients respectively. The quantization table 5c also stores data representing a variable quantization factor referred to as a variable Q factor. The basic quantization step sizes multiplied by the Q factor are used as final quantization step sizes (final quantization table values). The quantization table 5c informs the quantizing section 5b of the 8 by 8 final quantization step sizes (the 8 by 8 final quantization table values). The quantizing section 5b quantizes the DCT coefficient data in response to the final quantization-step sizes, thereby generating quantization-resultant DCT coefficient data. The quantizing section 5b outputs the quantization-resultant DCT coefficient data to the encoding section 5d.

Figure 4:
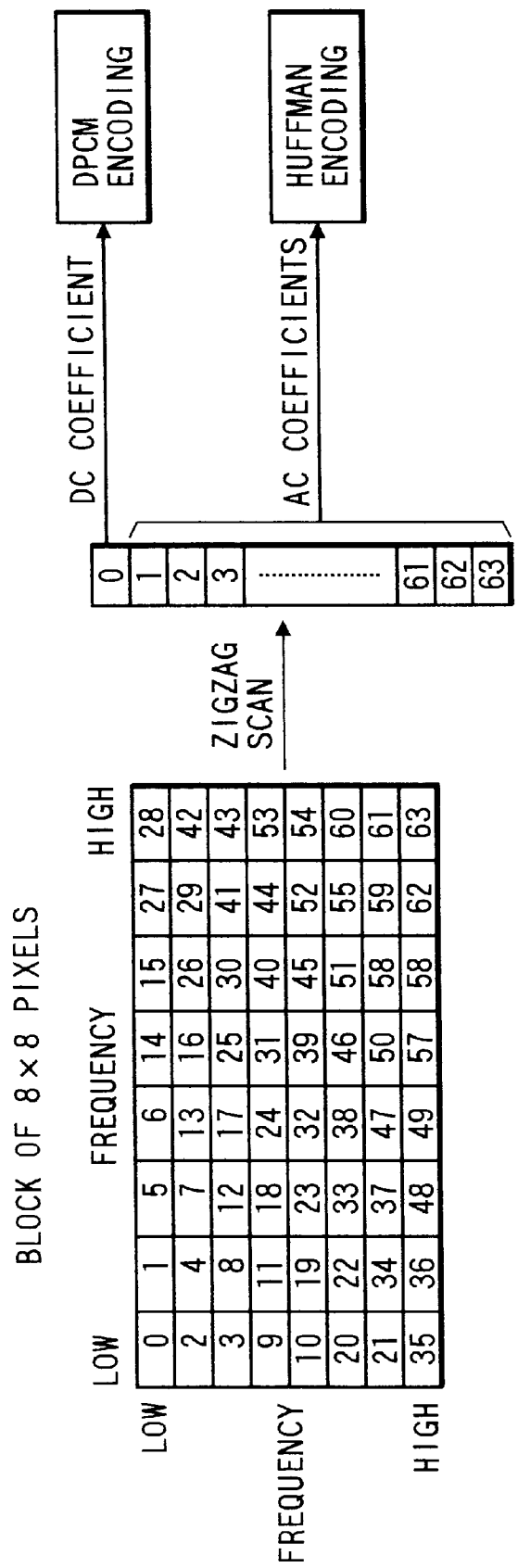
FIG. 4 is a diagram of an encoding process executed by the JPEG encoder/decoder in FIGS. 1 and 3.

The encoding section 5d rearranges 8 by 8 pieces of every 1-block portion of the quantization-resultant DCT coefficient data by a zigzag scanning process as shown in FIG. 4. The rearrangement-resultant data represents a sequence of a DC coefficient "0" and AC coefficients "1", "2", "3", ..., and "63" following the DC coefficient "0". As shown in FIG. 4, the current-block DC-coefficient data piece is subjected by the encoding section 5d to a DPCM (differential pulse code modulation) encoding process in response to the previous-block DC-coefficient data piece. On the other hand, the current-block AC-coefficient data pieces are subjected by the encoding section 5d to a Huffman-code-based encoding process in response to reference encoding information fed from the encoding table 5e. The encoding section 5d outputs the encoding-resultant data to the bus line 9.

During the playback mode of operation of the apparatus of FIG. 1, the decoding section 5f receives each of a digital Y signal and digital color difference signals R-Y and B-Y of the given code from the recording medium within the storage unit 11 via the bus line 9. The decoding section 5f subjects the received signal to a decoding process in response to information fed from the encoding table 5e. The decoding process by the decoding section 5f is inverse with respect to the encoding process by the encoding section 5d. The decoding section 5f outputs the decoding-resultant signal to the inversely quantizing section 5g. The output signal of the decoding section 5f corresponds to the output signal of the quantizing section 5b. The inversely quantizing section 5g subjects the output signal of the decoding section 5f to a given process in response to information fed from the quantization table 5c. The process by the inversely quantizing section 5g is inverse with respect to the quantization by the quantizing section 5b. The inversely quantizing section 5g outputs the inverse-quantization-resultant data to the inverse DCT section 5h. The output signal of the inversely quantizing section 5g corresponds to the output signal of the DCT section 5a. The inverse DCT section 5h subjects the output signal of the inversely quantizing section 5g to a given process which is inverse with respect to the discrete cosine transform by the DCT section 5a. The inverse DCT section 5h outputs the process-resultant signal to the raster block converter 4.

As previously described, the JPEG encoder/decoder 5 compresses the output signal of the raster block converter 4 during the compression recording mode of operation of the apparatus of FIG. 1. In the case where an input video signal is of the NTSC format, the output signal of the raster block converter 4 has a transmission data rate of about 18.42M bytes per second. It is preferable that the JPEG encoder/decoder 5 compresses the output signal of the raster block converter 4 into a transmission data rate of about 0.92M bytes per second. Portions of the output signal of the raster block converter 4 which correspond to alternate fields may be discarded. In this case, the output signal of the raster block converter 4 is preferably compressed into a transmission data rate of about 0.46M bytes per second.

The switch 99 connected between the input section 1 and the sync signal generator 7 is in its on state during the compression recording mode and the non-recording mode of operation of the apparatus of FIG. 1. Accordingly, the analog Y signal is transmitted from the input section 1 to the sync signal generator 7 during the compression recording mode and the non-recording mode of operation of the apparatus of FIG. 1. The switch 99 is in its off state and the sync signal generator 7 does not receive the analog Y signal during the playback mode of operation of the apparatus of FIG. 1.

Figure 19:
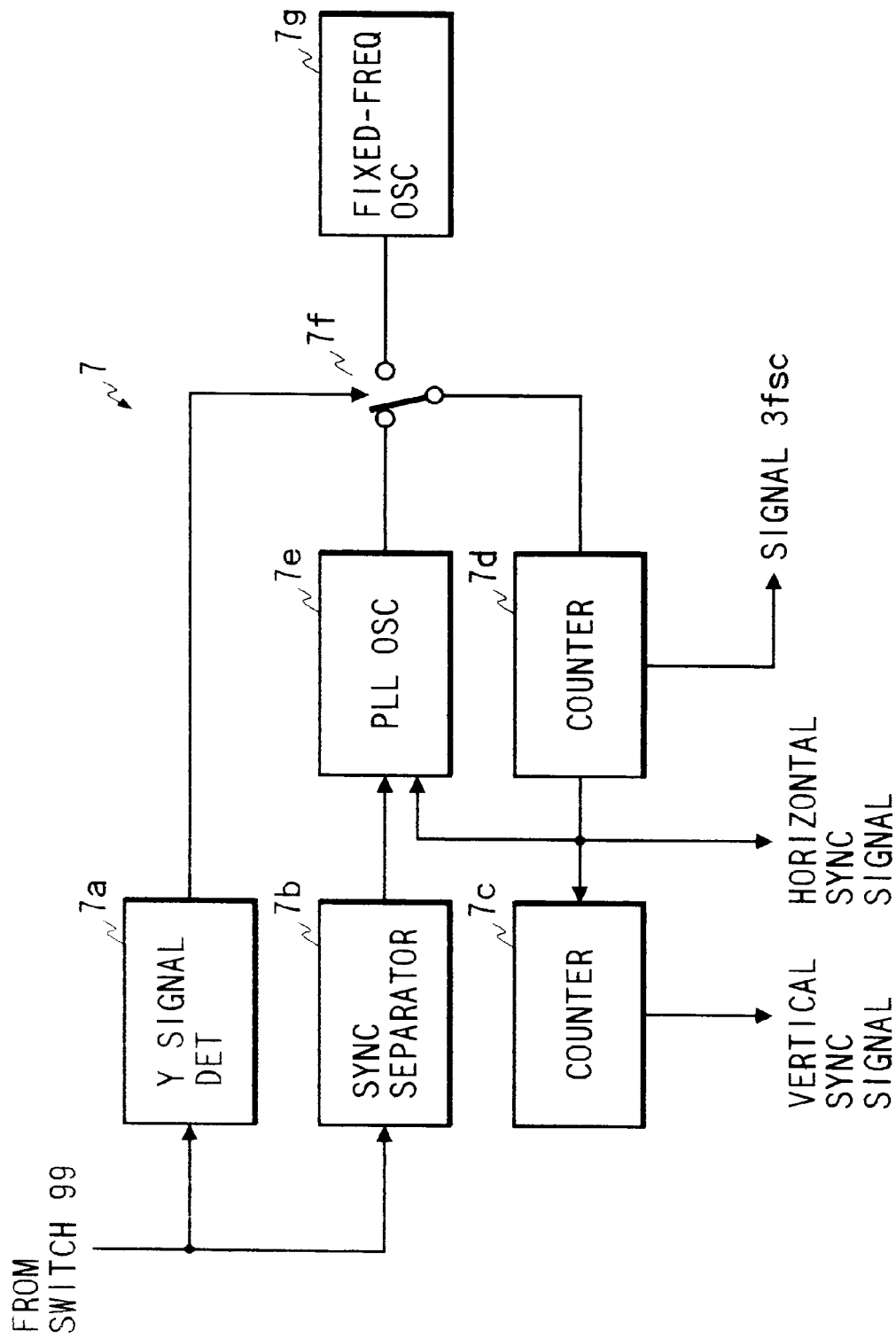
FIG. 19 is a block diagram of a sync signal generator in FIG. 1.

With reference to FIG. 19, the sync signal generator 7 includes a Y signal detector 7a, a sync separator 7b, counters 7c and 7d, a PLL oscillator 7e, a switch 7f, and a fixed-frequency oscillator 7g. The Y signal detector 7a and the sync separator 7b are connected via the switch 99 (see FIG. 1) to the input section 1 (see FIG. 1). The fixed-frequency oscillator 7g is provided with a quartz resonator, and outputs a signal having a predetermined frequency. The Y signal detector 7a decides whether or not a Y signal is present in the signal transmitted from the switch 99 (see FIG. 1). The Y signal detector 7a generates and outputs a binary signal representing the result of the decision. The output signal of the Y signal detector 7a is applied to the switch 7f as a switch control signal. When a Y signal is present in the signal transmitted from the switch 99 (see FIG. 1), the switch 7f connects the input terminal of the counter 7d to the output terminal of the PLL oscillator 7e and disconnects the input terminal of the counter 7d from the output terminal of the fixed-frequency oscillator 7g in response to the output signal of the Y signal detector 7a. When a Y signal is absent from the signal transmitted from the switch 99 (see FIG. 1), the switch 7f disconnects the input terminal of the counter 7d from the output terminal of the PLL oscillator 7e and connects the input terminal of the counter 7d to the output terminal of the fixed-frequency oscillator 7g in response to the output signal of the Y signal detector 7a.

In the sync signal generator 7 of FIG. 19, the sync separator 7b extracts a horizontal sync signal from a Y signal contained in the signal transmitted from the switch 99 (see FIG. 1). The sync separator 7b outputs the extracted horizontal sync signal to a first input terminal of the PLL oscillator 7e as a basic horizontal sync signal. The counter 7d receives the output signal of the PLL oscillator 7e or the output signal of the fixed-frequency oscillator 7g via the switch 7f. The device 7d counts pulses in the output signal of the PLL oscillator 7e or the output signal of the fixed-frequency oscillator 7g, thereby subjecting the output signal of the PLL oscillator 7e or the output signal of the fixed-frequency oscillator 7g to frequency dividing processes to generate a final horizontal sync signal and a signal 3fsc having a frequency equal to three times the frequency of a color subcarrier. The counter 7d outputs the final horizontal sync signal to a second input terminal of the PLL oscillator 7e. The final horizontal sync signal is phase-locked with respect to the basic horizontal sync signal by the PLL oscillator 7e. The counter 7d outputs the final horizontal sync signal to the input terminal of the counter 7c. The device 7c counts pulses in the final horizontal sync signal, thereby subjecting the final horizontal sync signal to a frequency dividing process to generate a vertical sync signal.

The horizontal sync signal generated by the counter 7d and the vertical sync signal generated by the counter 7c are transmitted to the signal processor 6b and the combining device 6c within the output section 6 (see FIG. 1). The signal 3fsc generated by the counter 7d is transmitted to the A/D converters 2 (see FIG. 1), the memory 3 (see FIG. 1), the signal processor 6b (see FIG. 1), and the combining device 6c (see FIG. 1).

Figure 5:
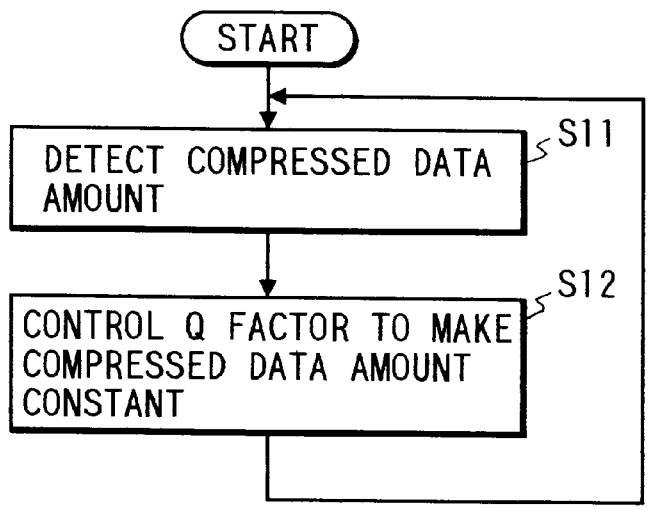
FIG. 5 is a flowchart of a first segment of a program for controlling a CPU in FIG. 1.

As previously described, the CPU 8 operates in accordance with a program stored in the ROM 12. FIG. 5 is a flowchart of a first segment of the program which is executed during the compression recording mode of operation of the apparatus of FIG. 1.

As shown in FIG. 5, a first step S11 of the first program segment detects the number of bits in the signal outputted from the JPEG encoder/decoder 5 to the bus line 9 during every unit period. A step S12 following the step S11 controls a quantization factor (a Q factor) in the quantization table 5c in response to the detected number of bits per unit period. The Q factor has a given relation with the quantization step sizes. The control of the Q factor is designed so that the data transmission rate of the signal outputted from the JPEG encoder/decoder 5 to the bus line 9 will be substantially constant. Specifically, the Q factor is decreased and increased as the detected number of bits per unit period decreases and increases respectively. After the step S12, the program returns to the step S11.

Figure 6:
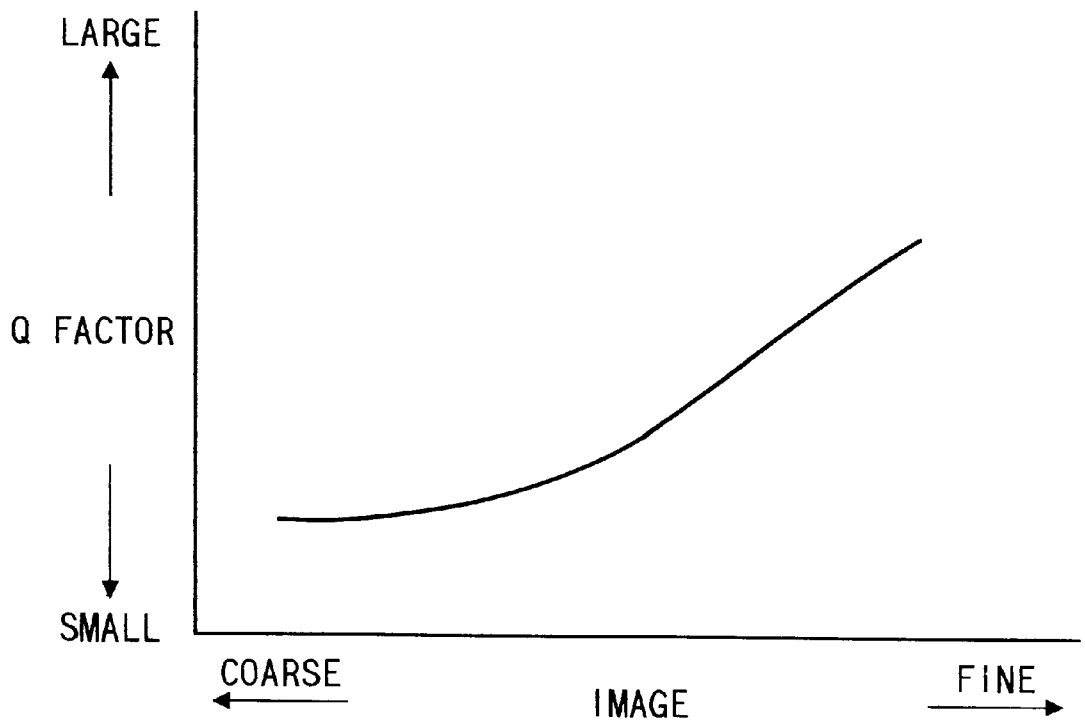
FIG. 6 is a diagram of the relation between image texture conditions and a Q factor.

With reference to FIG. 6, the Q factor is relatively great when the signal outputted from the JPEG encoder/decoder 5 to the bus line 9 represents a fine-pattern image. The Q factor is relatively small when the signal outputted from the JPEG encoder/decoder 5 to the bus line 9 represents a coarse-pattern image.

Figure 7:
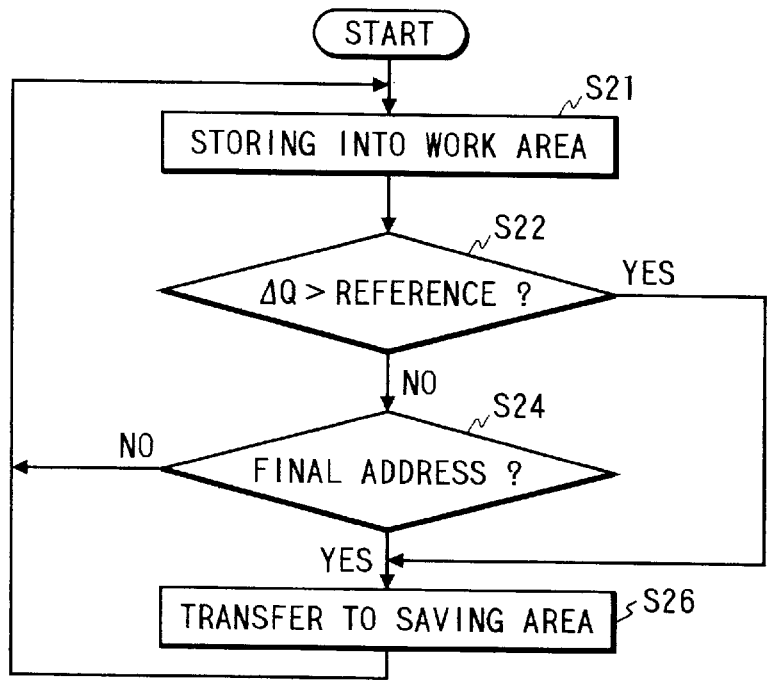
FIG. 7 is a flowchart of a second segment of the program for controlling the CPU in FIG. 1.

FIG. 7 is a flowchart of a second segment of the program which is executed during the compression recording mode of operation of the apparatus of FIG. 1. As shown in FIG. 7, a first step S21 of the second program segment stores the output signal of the JPEG encoder/decoder 5 into a work area in the RAM 13 via the bus line 9. Alternatively, the output signal of the JPEG encoder/decoder 5 may be stored into a work area in the recording medium within the storage unit 11 via the bus line 9 and the interface 10.

A step S22 following the step S21 decides whether or not the absolute value ΔQ of a time-domain variation (a time-dependent variation) of the Q factor in unit time is greater than a reference value by referring to the logic state of a given flag. The time-domain variation of the Q factor in unit time corresponds to a temporal differential value of the Q factor. In other words, the step S22 decides whether or not the absolute value of a rate of a time-domain variation in the Q factor is greater than a reference value. When the absolute value ΔQ is not greater than the reference value, the program advances from the step S22 to a step S24. When the absolute value ΔQ is greater than the reference value, the program jumps from the step S22 to a step S26.

The step S24 decides whether or not the currently-accessed address in the work area reaches a final address. When the currently-accessed address in the work area reaches the final address, the program advances from the step S24 to the step S26. Otherwise, the program returns from the step S24 to the step S21.

The step S26 transfers at least a portion of the stored signal from the work area in the RAM 13 to a saving area in the recording medium within the storage unit 11 via the bus line 9 and the interface 10. In the case where the work area in the recording medium within the storage unit 11 is used instead of the work area in the RAM 13, at least a portion of the stored signal is transferred from the work area in the recording medium within the storage unit 11 to the saving area therein. The step S26 stores the transferred signal into the saving area in the recording medium within the storage unit 11. In the case where the absolute value ΔQ exceeds the reference value so that the program jumps from the step S22 to the step S26, the signal stored into the saving area is chosen to correspond to a time interval containing the moment at which the absolute value ΔQ exceeds the reference value. The time interval is equal to, for example, several seconds. After the step S26, the program returns to the step S21.

Each time the step S21 is executed, the currently-accessed address in the work area is updated. After the currently-accessed address in the work area reaches the final address, the currently-accessed address is updated and returned to a first address (a start or head address).

The steps S22 and S26 enable the following process. In the case where the Q factor changes at a relatively great rate, the output signal of the JPEG encoder/decoder 5 which corresponds to a time interval containing the moment of the occurrence of the great change in the Q factor is stored into the saving area in the recording medium within the storage unit 11. Under certain conditions, a change in the Q factor at a relatively great rate means that the images represented by the output signal of the JPEG encoder/decoder 5 have quickly moving portions.

In the case where the absolute value ΔQ is not greater than the reference value, a larger part of the video information may be discarded by, for example, increasing the degree of thinning out frames. The number of recorded frames may be increased as the Q factor increases. The step S24 may be modified to decide whether or not a given time has elapsed since the start moment or the last execution of the step S26. In this case, the transfer of the signal to the saving area in the recording medium within the storage unit 11 is iteratively executed at a given period.

The program segment in FIG. 7 may be modified so that the step S26 will be executed only when the step S22 finds the absolute value ΔQ to be greater than the reference value.

Figure 8:
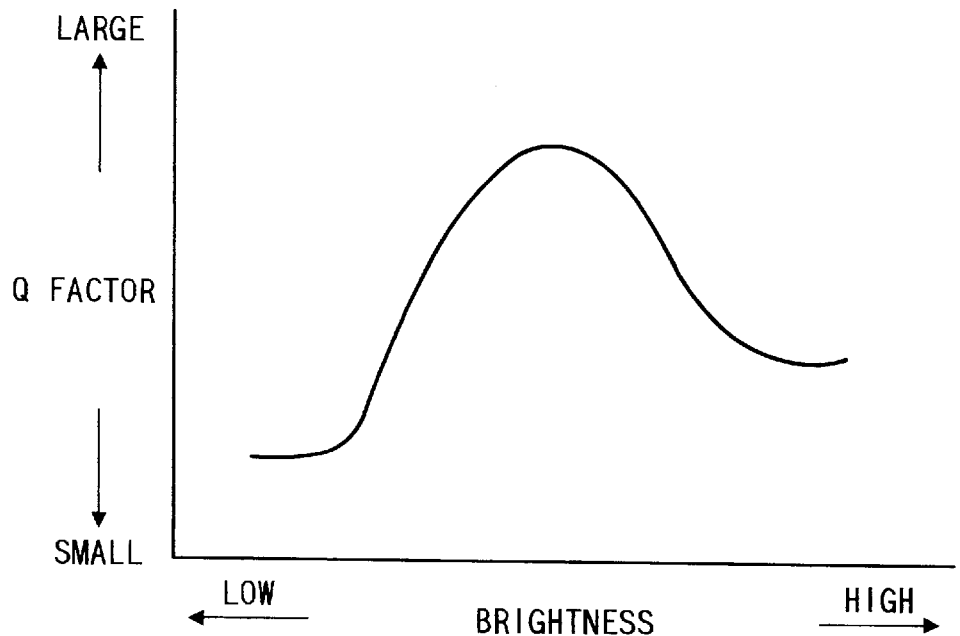
FIG. 8 is a diagram of the relation between an image brightness and a Q factor.
Figure 9:
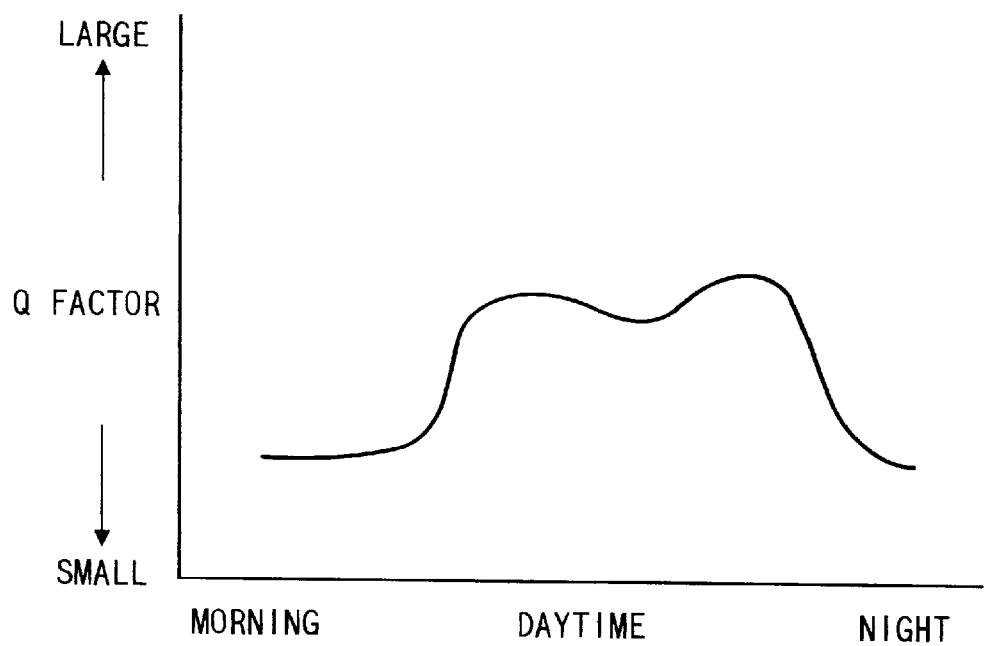
FIG. 9 is a diagram of a daily variation in a Q factor for a still scene.

As previously described, the control of the Q factor is designed so that the data transmission rate of the signal outputted from the JPEG encoder/decoder 5 to the bus line 9 will be substantially constant. In this case, as shown in FIG. 8, the Q factor is varied in accordance with the brightness of a still scene related to the video information. Further, as shown in FIG. 9, the Q factor exhibits a daily variation for a still scene. In view of these facts, it is advantageous to distinguish a temporary variation in the Q factor from an untemporary variation therein.

Figure 10:
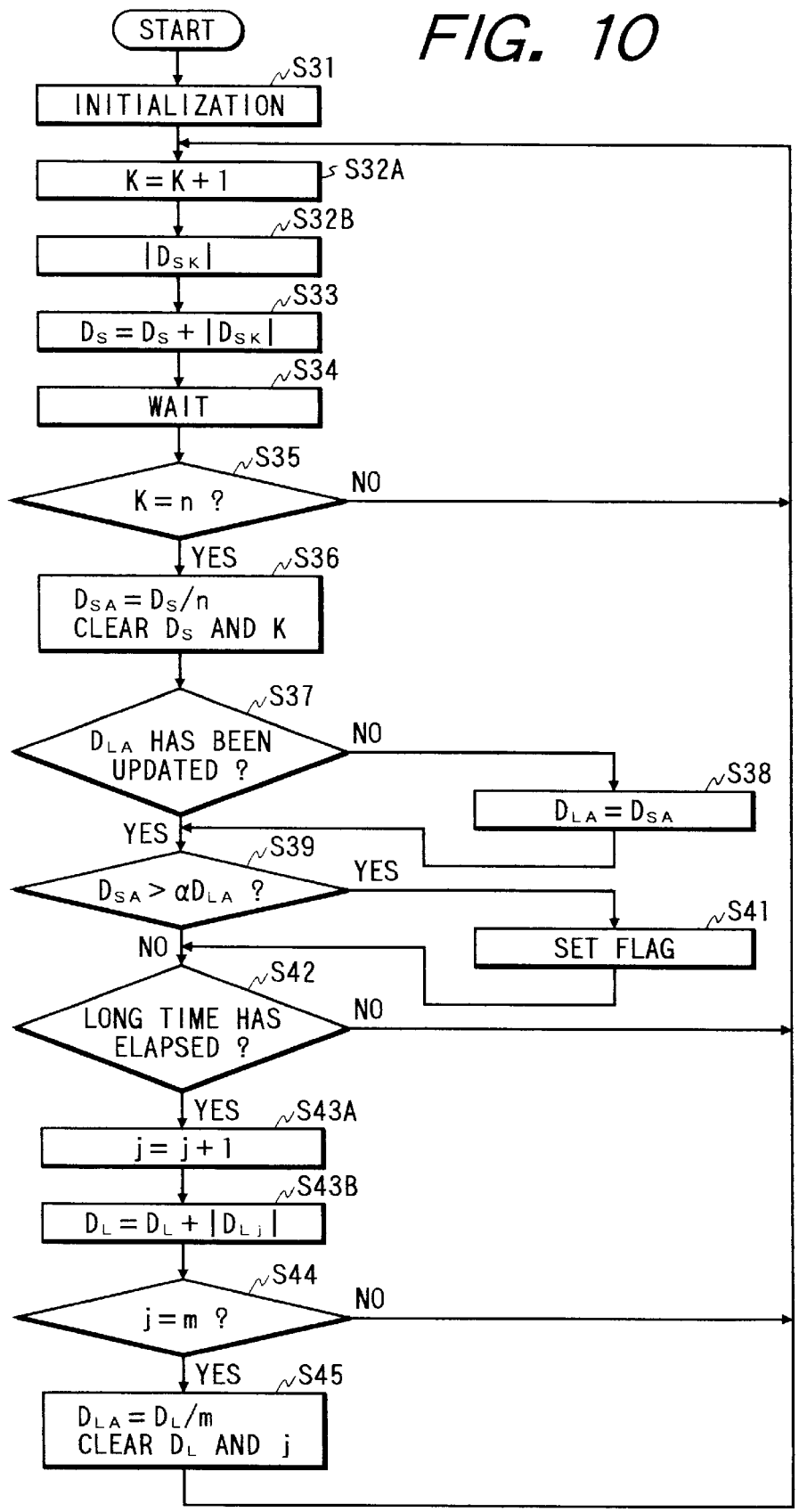
FIG. 10 is a flowchart of a third segment of the program for controlling the CPU in FIG. 1.

FIG. 10 is a flowchart of a third segment of the program which is executed during the compression recording mode of operation of the apparatus of FIG. 1. As will be made clear later, the third program segment relates to the step S22 in FIG. 7. As shown in FIG. 10, a first step S31 of the third program segment initializes variables DS, DSA, DL, DLA, "j", and "k", and also other variables and flags. Specifically, the step S31 clears the values DS, DSA, DL, and DLA to "0", and sets the values "j" and "k" to "0". After the step S31, the program advances to a step S32A.

The step S32A increments the value "k" by "1". A step S32B following the step S32A calculates the number |Dsk| of bits representing the absolute value of the current Q factor. A step S33 following the step S32 increments the value DS by a value equal to the bit number |Dsk|. A step S34 following the step S33 waits for a given time equal to, for example, 0.5 second. A step S35 subsequent to the step S34 decides whether or not the value "k" is equal to a given natural number "n". When the value "k" is equal to the given number "n", the program advances from the step S35 to a step S36. Otherwise, the program returns from the step S35 to the step S32A. The given number "n" is equal to 2 or greater. For example, the given number "n" is equal to 6.

The step S36 calculates the new value DSA from the value DS and the given number "n" by referring to the equation "DSA =DS/n". At this stage, the value DS is given as "DS=|DS1|+|DS2|+. . . +|DSn|". The value DS is a mean value (an average value) among the values |DS1|, |DS2|, . . . , and |DSn| which occur at moments spaced by short intervals. Then, the step S36 clears the value DS, and initializes the value "k".

A step S37 following the step S36 decides whether or not a later step S43B has been executed, that is, whether or not the value DLA has already been updated. When the value DLA has already been updated, the program advances from the step S37 to a step S38. Otherwise, the program advances from the step S37 to a step S39.

The step S38 sets the value DLA equal to the value DSA. After the step S38, the program advances to the step S39.

The step S39 calculates the value α●DLA equal to the product of the value DLA and a predetermined value α. The predetermined value α is equal to, for example, 0.3. The results of experiments indicate that the predetermined value α is preferably in the range of about 0.1 to about 0.4, and is most preferably in the range of about 0.2 to about 0.3. The step S39 decides whether or not the value DSA is greater than the value α●DLA. When the value DSA is greater than the value α●DLA, the program advances from the step S39 to a step S41. Otherwise, the program advances from the step S39 to a step S42.

The step S41 sets a given flag. In other words, the step S41 sets the given flag to "1". After the step S41, the program advances to the step S42.

The step S42 decides whether or not at least a given long time (for example, 3 minutes) has elapsed from the moment of the last execution of a subsequent step S43A. When at least the given long time has elapsed from the moment of the last execution of the step S43A, the program advances from the step S42 to the step S43A. Otherwise, the program returns from the step S42 to the step S32A. In the case where the step S43A has not yet been executed, the program also returns from the step S42 to the step S32A.

The step S43A increments the value "j" by "1". A step S43B subsequent to the step S43A increments the value DL by a value |DLj| equal to the value DSA.

A step S44 following the step S43B decides whether or not the value "j" is equal to a given natural number "m". When the value "j" is equal to the given number "m", the program advances from the step S44 to a step S45. Otherwise, the program returns from the step S44 to the step S32A. The given number "m" is equal to or greater than the given number "n". For example, the given number "m" is equal to 180.

The step S45 calculates the new value DLA from the value DL and the given number "m" by referring to the equation "DLA=DL/m". At this stage, the value DL is given as "DL=|DL1|+|DL2|+. . . +|DLm|". The value DL is a mean value (an average value) among the values |DL1|, |DL2|, . . . , and |DLm| which occur at moments spaced by long intervals. Then, the step S45 clears the value DL, and initializes the value "j". After the step S45, the program returns to the step S32A.

The given flag set by the step S41 is used in the decision by the step S22 in FIG. 7. In the case where the given flag is set by the step S41, the program jumps from the step S22 to the step S26 in FIG. 7. In other cases, the program advances from the step S22 to the step S24 in FIG. 7.

The program for the CPU 8 has a main routine and sub routines. The program segments in FIGS. 5, 7, and 10 are the sub routines. The main routine of the program is designed so that the program segments in FIGS. 5, 7, and 10 are executed substantially in parallel on a time-division multi-task basis.

Second Embodiment

A second embodiment of this invention is similar to the embodiment of FIGS. 1–10 except for design changes indicated later. In the second embodiment, a Q factor used by a JPEG encoder/decoder 5 (see FIG. 1) is fixed.

Figure 11:
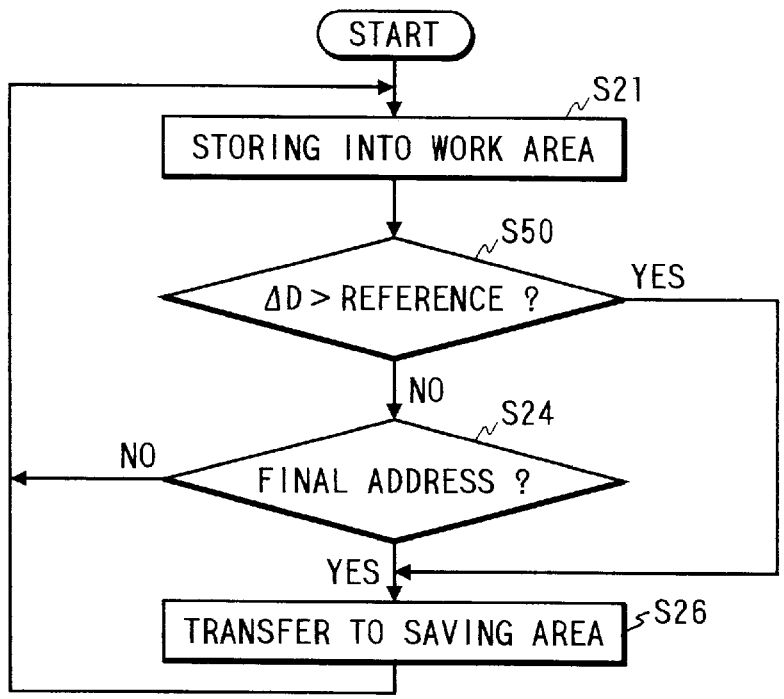
FIG. 11 is a flowchart of a segment of a program for controlling a CPU in a video signal recording and reproducing apparatus according to a second embodiment of this invention.

The second embodiment uses a program segment in FIG. 11 for the program segment in FIG. 7. As shown in FIG. 11, a first step S21 of the program segment stores the output signal of the JPEG encoder/decoder 5 into a work area in a RAM 13 (see FIG. 1) via a bus line 9 (see FIG. 1). Alternatively, the output signal of the JPEG encoder/decoder 5 may be stored into a work area in the recording medium within a storage unit 11 (see FIG. 1) via the bus line 9 and an interface 10 (see FIG. 1).

A step S50 following the step S21 calculates the absolute value ΔD of a time-domain unit-time variation (a time-dependent unit-time variation) of the data transmission rate regarding the output signal of the JPEG encoder/decoder 5. The step S50 decides whether or not the absolute value ΔD is greater than a reference value. The time-domain unit-time variation of the data transmission rate corresponds to a temporal differential value of the data transmission rate. When the absolute value ΔD is not greater than the reference value, the program advances from the step S50 to a step S24. When the absolute value ΔD is greater than the reference value, the program advances from the step S50 to a step S26.

It should be noted that the decision by the step S50 may be executed by applying the data transmission rate to the program segment in FIG. 10.

The step S24 decides whether or not the currently-accessed address in the work area reaches a final address. When the currently-accessed address in the work area reaches the final address, the program advances from the step S24 to the step S26. Otherwise, the program returns from the step S24 to the step S21.

The step S26 transfers at least a portion of the stored signal from the work area in the RAM 13 to a saving area in the recording medium within the storage unit 11 via the bus line 9 and the interface 10. In the case where the work area in the recording medium within the storage unit 11 is used instead of the work area in the RAM 13, at least a portion of the stored signal is transferred from the work area in the recording medium within the storage unit 11 to the saving area therein. The step S26 stores the transferred signal into the saving area in the recording medium within the storage unit 11. In the case where the absolute value ΔD exceeds the reference value so that the program jumps from the step S50 to the step S26, the signal stored into the saving area is chosen to correspond to a time interval containing the moment at which the absolute value ΔD exceeds the reference value. The time interval is equal to, for example, several seconds. After the step S26, the program returns to the step S21.

Each time the step S21 is executed, the currently-accessed address in the work area is updated. After the currently-accessed address in the work area reaches the final address, the currently-accessed address is updated and returned to a first address (a start or head address).

The program segment in FIG. 11 may be modified so that the step S26 will be executed only when the step S50 finds the absolute value ΔD to be greater than the reference value.

Figure 12:
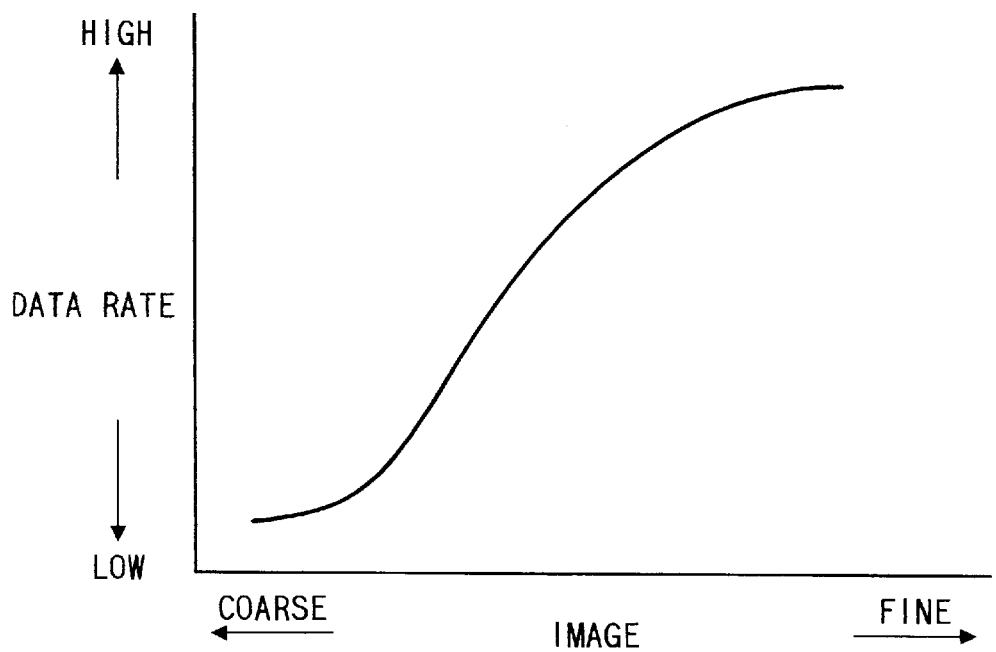
FIG. 12 is a diagram of the relation between image texture conditions and a data rate.
Figure 13:
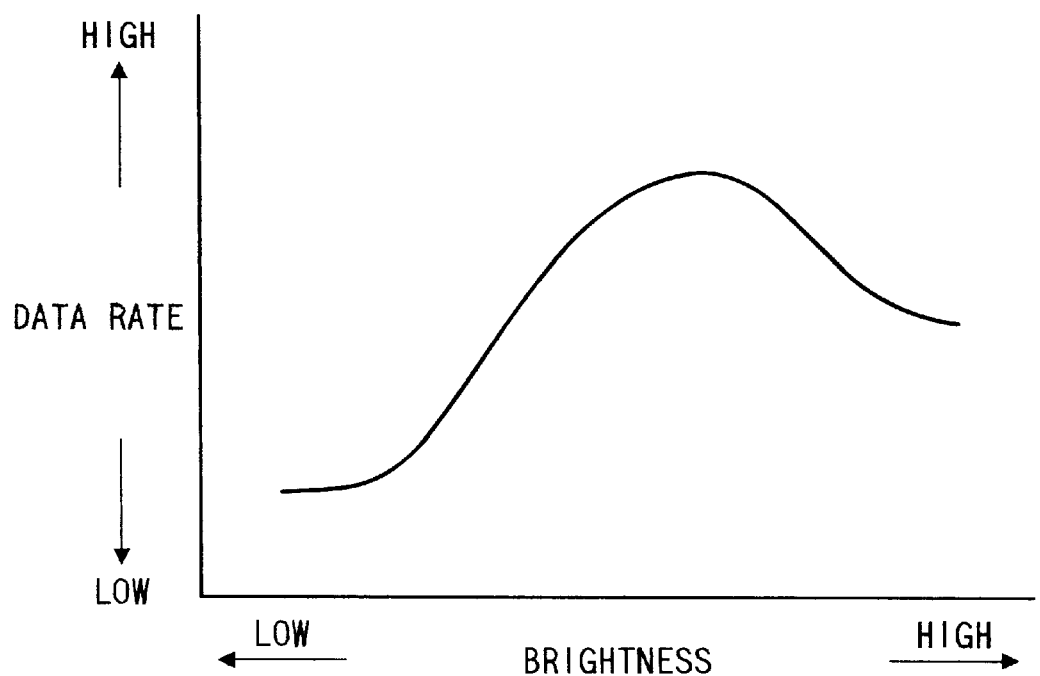
FIG. 13 is a diagram of the relation between an image brightness and a data rate.
Figure 14:
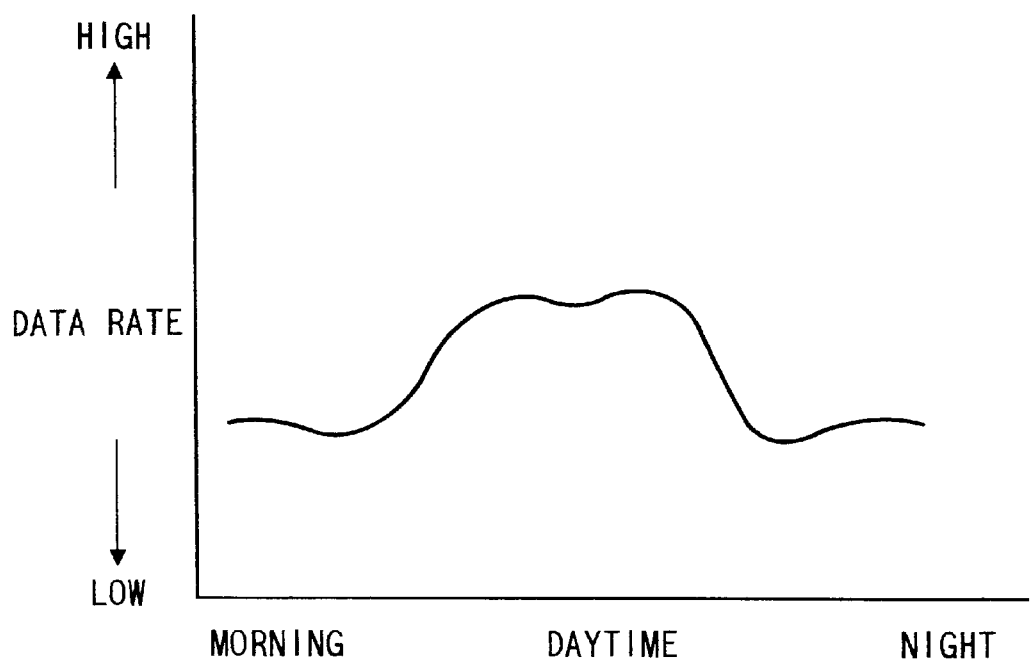
FIG. 14 is a diagram of a daily variation in a data rate for a still scene.

As previously described, the Q factor used by the JPEG encoder/decoder 5 is fixed. In this case, as shown in FIG. 12, the transmission data rate regarding the output signal of the JPEG encoder/decoder 5 is relatively high when the output signal of the JPEG encoder/decoder 5 represents a fine-pattern image. On the other hand, the transmission data rate regarding the output signal of the JPEG encoder/decoder 5 is relatively low when the output signal of the JPEG encoder/decoder 5 represents a coarse-pattern image. Also, as shown in FIG. 13, the transmission data rate regarding the output signal of the JPEG encoder/decoder 5 varies in accordance with the brightness of a still scene related to the video information. Further, as shown in FIG. 14, the transmission data rate regarding the output signal of the JPEG encoder/decoder 5 exhibits a daily variation for a still scene.

Third Embodiment

Figure 15:
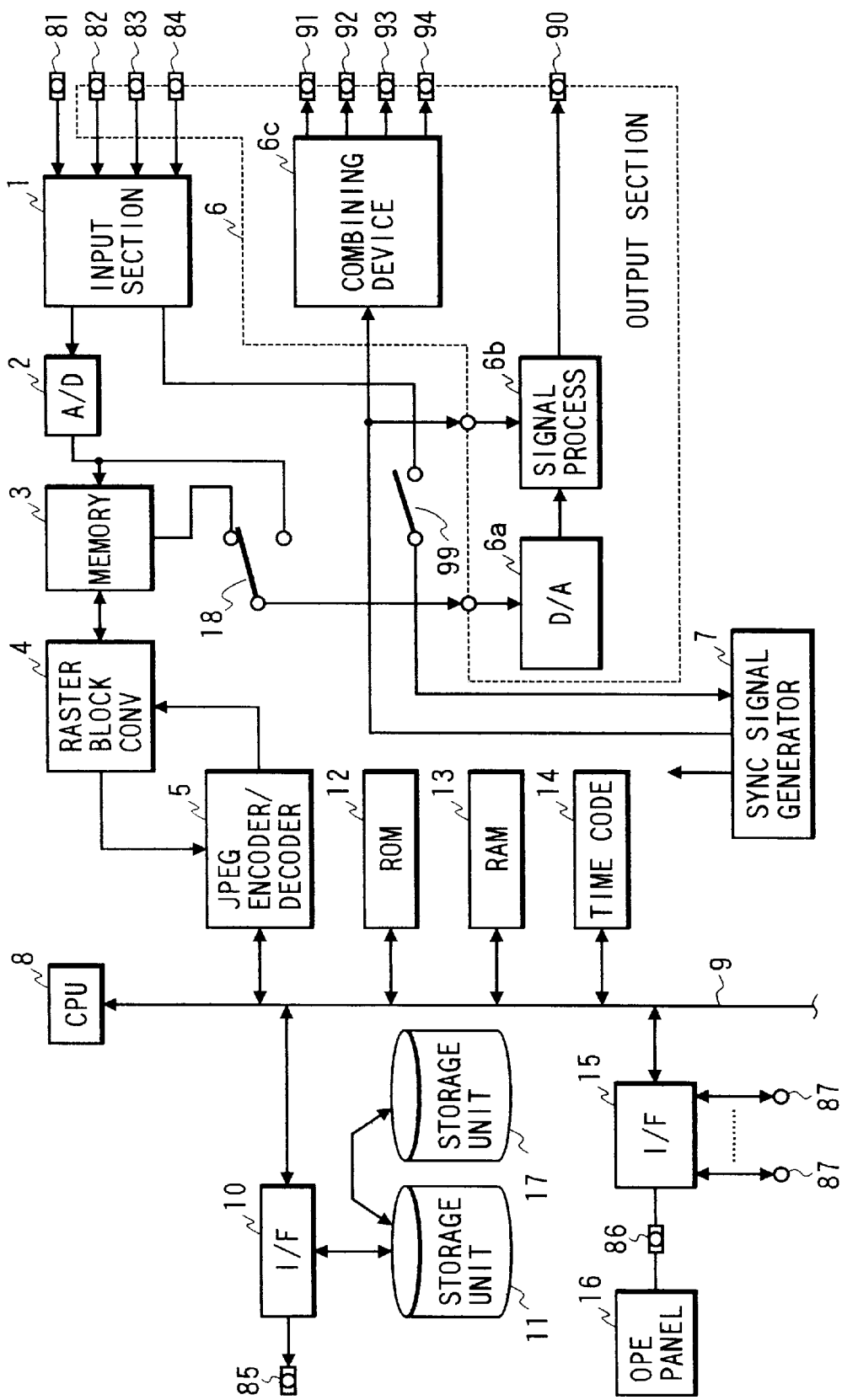
FIG. 15 is a block diagram of a video signal recording and reproducing apparatus according to a third embodiment of this invention.

FIG. 15 shows a third embodiment of this invention which is similar to the embodiment of FIGS. 1–10 except for design changes indicated hereinafter. The embodiment of FIG. 15 includes a storage unit 17 which is connected to a storage unit 11 and an interface 10. The storage unit 17 includes, for example, a combination of a disk drive and a magneto-optical disk or a combination of a disk drive and a magnetic disk. In the embodiment of FIG. 15, a signal to be recorded is stored into a saving area in the recording medium within the storage unit 17 rather than a saving area in the recording medium within the storage unit 11.

Figure 16:
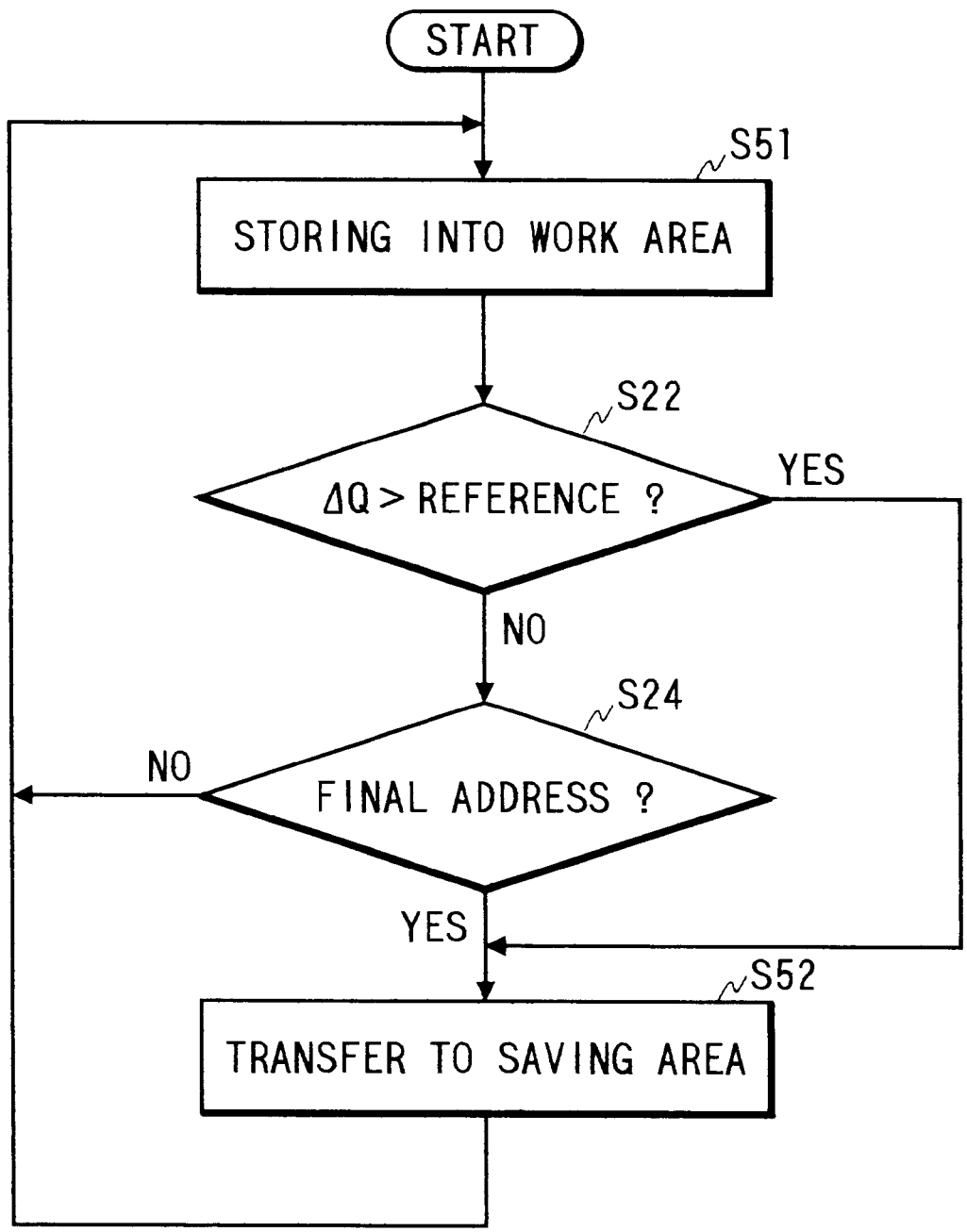
FIG. 16 is a flowchart of a segment of a program for controlling a CPU in FIG. 15.

The third embodiment uses a program segment in FIG. 16 for the program segment in FIG. 7. As shown in FIG. 16, a first step S51 of the program segment stores the output signal of a JPEG encoder/decoder 5 into a work area in the recording medium within the storage unit 11 via a bus line 9 and the interface 10. Alternatively, the output signal of the JPEG encoder/decoder 5 may be stored into a work area in a RAM 13 via the bus line 9.

A step S22 following the step S51 decides whether or not the absolute value ΔQ of a time-domain variation (a time-dependent variation) of a Q factor in unit time is greater than a reference value by referring to the logic state of a given flag. The time-domain variation of the Q factor in unit time corresponds to a temporal differential value of the Q factor. In other words, the step S22 decides whether or not the absolute value of a rate of a time-domain variation in the Q factor is greater than a reference value. When the absolute value ΔQ is not greater than the reference value, the program advances from the step S22 to a step S24. When the absolute value ΔQ is greater than the reference value, the program advances from the step S22 to a step S26.

The step S24 decides whether or not the currently-accessed address in the work area reaches a final address. When the currently-accessed address in the work area reaches the final address, the program advances from the step S24 to the step S52. Otherwise, the program returns from the step S24 to the step S51.

The step S52 transfers at least a portion of the stored signal from the work area in the recording medium within the storage unit 11 to a saving area in the recording medium within the storage unit 17. In the case where the work area in the RAM 13 is used instead of the work area in the recording medium within the storage unit 11, at least a portion of the stored signal is transferred from the work area in the RAM 13 to the saving area in the recording medium within the storage unit 17 via the bus line 9 and the interface 10. The step S52 stores the transferred signal into the saving area in the recording medium within the storage unit 17. After the step S52, the program returns to the step S51.

Each time the step S51 is executed, the currently-accessed address in the work area is updated. After the currently-accessed address in the work area reaches the final address, the currently-accessed address is updated and returned to a first address (a start or head address).

The program segment in FIG. 16 may be modified so that the step S52 will be executed only when the step S22 finds the absolute value ΔQ to be greater than the reference value.

Fourth Embodiment

A fourth embodiment of this invention is similar to the embodiment of FIG. 11 except for design changes indicated hereinafter. The fourth embodiment includes a storage unit 17 (see FIG. 15) as the embodiment of FIGS. 15 and 16 does. The fourth embodiment is similar to the embodiment of FIGS. 15 and 16 in that a signal to be recorded is stored into a saving area in the recording medium within the storage unit 17 rather than a saving area in the recording medium within a storage unit 11.

Fifth Embodiment

Figure 17:
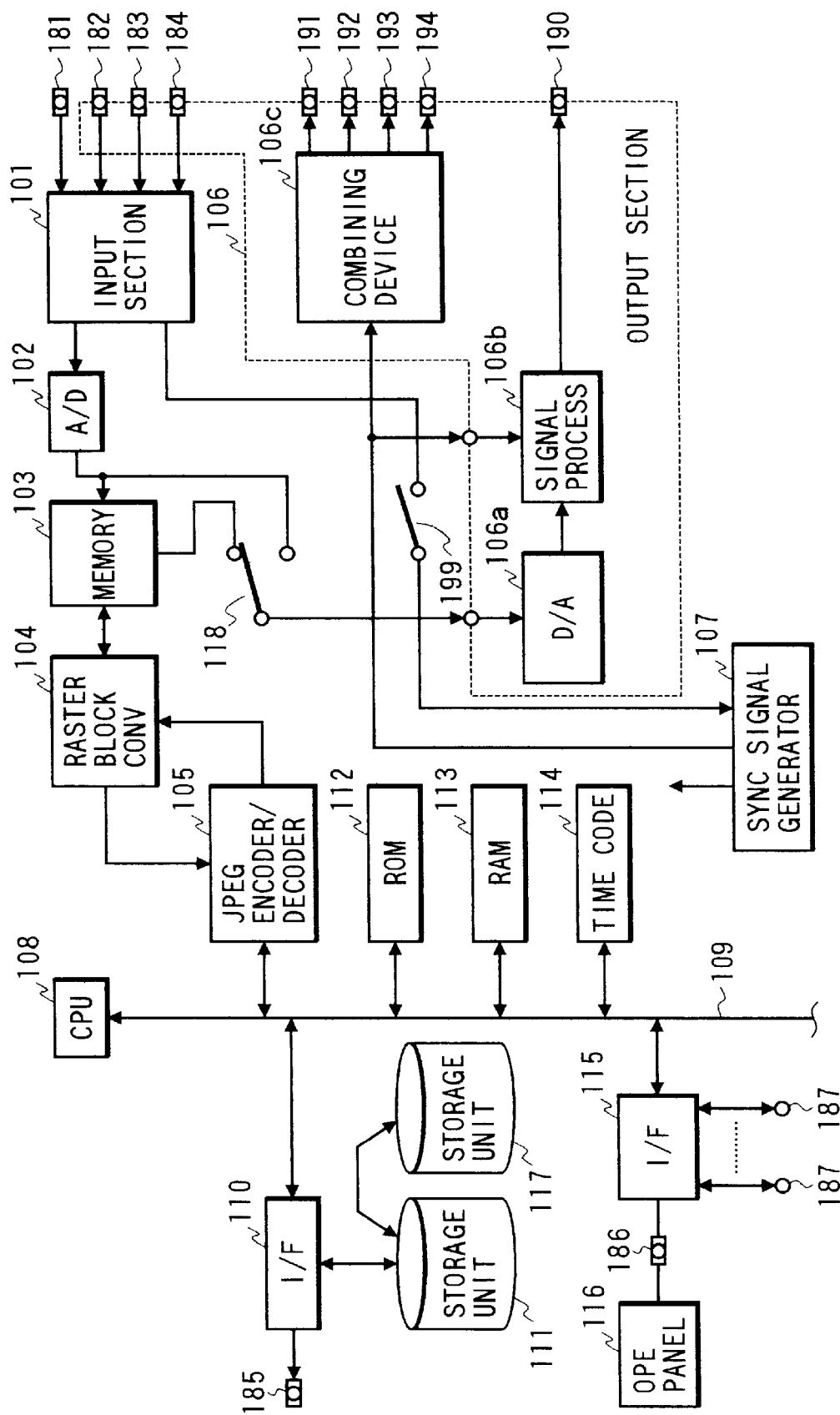
FIG. 17 is a block diagram of a video signal recording and reproducing apparatus according to a fifth embodiment of this invention.

With reference to FIG. 17, a video signal recording and reproducing apparatus includes input terminals 181, 182, 183, and 184 followed by an input section 101. Four different video signals can be applied to the input section 101 via the input terminals 181, 182, 183, and 184 respectively. A composite video signal and a set of a luminance signal (a Y signal) and a chrominance signal (a C signal) can be transmitted to the input section 101 via each of the input terminals 181, 182, 183, and 184. The input section 101 can handle either an input composite video signal or a set of input Y and C signals.

In an exemplary case where television cameras (not shown) are connected to the input terminals 181, 182, 183, and 184 respectively, video signals generated by the television cameras are transmitted to the input section 101 via the respective input terminals 181, 182, 183, and 184.

The input section 101 selects one of input video signals fed via the respective input terminals 181, 182, 183, and 184, and separates the selected input video signal into a set of an analog Y signal and analog color difference signals R-Y and B-Y. The input section 101 outputs the analog Y signal and the analog color difference signals R-Y and B-Y to A/D converters 102. It should be noted that the input section 101 may sequentially and cyclically select one of the input video signals at a given selection change period equal to, for example, an even natural number times the period of vertical sync components of the input video signals. Alternatively, the input section 101 may continuously select one of the input video signals in the absence of a selection change requirement.

The input section 101 is connected to a sync signal generator 107 via a switch 199. When the switch 199 is closed (when the switch 199 is in an on state), the analog Y signal can be transmitted from the input section 101 to the sync signal generator 107. When the switch 199 is opened (when the switch 199 is in an off state), the transmission of the analog Y signal from the input section 101 to the sync signal generator 107 is inhibited.

The A/D converters 102 change the analog Y signal and the analog color difference signals R-Y and B-Y into a corresponding digital Y signal and corresponding digital color difference signals R-Y and B-Y respectively. During the A/D conversions, the A/D converters 102 periodically sample the analog Y signal and the analog color difference signals R-Y and B-Y in response to a sampling clock signal synchronized with the selected input video signal. A signal 3fsc fed from the sync signal generator 107 is used as the sampling clock signal. The A/D converters 102 output the digital Y signal and the digital color difference signals R-Y and B-Y to a memory 103 and a switch 118. The digital Y signal and the digital color difference signals R-Y and B-Y outputted from the A/D converters 102 are referred to as the first digital Y signal and the first digital color difference signals R-Y and B-Y.

During a compression recording mode of operation of the apparatus of FIG. 17, time segments of the first digital Y signal and the first digital color difference signals R-Y and B-Y which correspond to every frame are written into the memory 103. In other words, 1-frame segments of the first video information are successively written into the memory 103. The signal 3fsc fed from the sync signal generator 107 is used as a clock signal for determining a timing of access to the memory 103.

During the compression recording mode of operation of the apparatus of FIG. 17, a raster block converter 104 accesses the memory 103 to divide every 1-frame segment of the video information into a given number of blocks each corresponding to neighboring 8 by 8 pixels. Specifically, during every 1-block period, the raster block converter 104 sequentially reads out pieces of each of the first digital Y signal and the first digital color difference signals R-Y and B-Y, which correspond to neighboring 8 by 8 pixels, from the memory 103. The raster block converter 104 outputs the 1-block segment of each of the first digital Y signal and the first digital color difference signals R-Y and B-Y to a JPEG encoder/decoder 105. In this way, the combination of the memory 103 and the raster block converter 104 rearranges the first digital Y signal and the first digital color difference signals R-Y and B-Y into a second digital Y signal and second digital color difference signals R-Y and B-Y. The raster block converter 104 outputs the second digital Y signal and the second digital color difference signals R-Y and B-Y to the JPEG encoder/decoder 105.

During the compression recording mode of operation of the apparatus of FIG. 17, the JPEG encoder/decoder 105 receives the second digital Y signal and the second digital color difference signals R-Y and B-Y from the raster block converter 104, and processes each of the second digital Y signal and the second digital color difference signals R-Y and B-Y block by block. Specifically, the JPEG encoder/decoder 105 compresses and encodes the second digital Y signal and the second digital color difference signals R-Y and B-Y into a third digital Y signal and third digital color difference signals R-Y and B-Y of a given code according to the picture compressing algorithm or the signal processing algorithm of the JPEG standards.

The JPEG encoder/decoder 105, a CPU 108, an interface 110, a ROM 112, a RAIM 113, a time code generator 114, and an interface 115 are connected to a bus line 109. The interface 110 is connected to a storage unit 111 and an output terminal 185. The storage unit 111 includes, for example, a combination of a disk drive and a magneto-optical disk or a combination of a disk drive and a magnetic disk. A storage unit 117 is connected to the storage unit 111 and the interface 110. The storage unit 117 includes, for example, a combination of a disk drive and a magneto-optical disk or a combination of a disk drive and a magnetic disk. The interface 115 is connected to terminals 187. Signals can be transmitted to and from the interface 115 via the terminals 187. The interface 115 can also be connected via a connection terminal 186 to an operation panel 116. The CPU 108 operates in accordance with a program stored in the ROM 112. The CPU 108 provides a work area in the RAM 113. The time code generator 114 produces time information.

During the compression recording mode of operation of the apparatus of FIG. 17, the CPU 108 controls the JPEG encoder/decoder 105 so that the third digital Y signal and the third digital color difference signals R-Y and B-Y of the given code are outputted from the JPEG encoder/decoder 105 to the bus line 109. Subsequently, the third digital Y signal and the third digital color signals R-Y and B-Y of the given code are transmitted to the interface 110 via the bus line 109, or transmitted to and stored into the RAM 113 via the bus line 109 before being transferred from the RAM 113 to the interface 110 via the bus line 109. Then, the third digital Y signal and the third digital color difference signals R-Y and B-Y of the given code are fed from the interface 110 to the storage unit 111 before being stored into a recording medium within the storage unit 111. The third digital Y signal and the third digital color difference signals R-Y and B-Y of the given code can be transmitted from the interface 110 to an external device via the output terminal 185.

During the compression recording mode of operation of the apparatus of FIG. 17, the CPU 108 accesses the storage unit 111 and thins out the third digital Y signal and the third digital color difference signals R-Y and B-Y of the given code into a fourth digital Y signal and fourth digital color difference signals R-Y and B-Y. The CPU 108 controls the storage units 111 and 117 so that the fourth digital Y signal and the fourth digital color difference signals R-Y and B-Y are transferred from the storage unit 111 to the storage unit 117. The fourth digital Y signal and the fourth digital color difference signals R-Y and B-Y are stored into the recording medium within the storage unit 117.

During a playback mode of operation of the apparatus of FIG. 17, the interface 110 and the storage unit 117 are controlled by the CPU 108 so that a digital Y signal and digital color difference signals R-Y and B-Y of the given code are transmitted from the recording medium within the storage unit 117 to the JPEG encoder/decoder 105 via the interface 110 and the bus line 109. It should be noted that the digital Y signal and the digital color difference signals R-Y m, and B-Y of the given code may be transmitted from the recording medium within the storage unit 117 to an external device via the interface 110 and the output terminal 185. The JPEG encoder/decoder 105 expands and decodes the digital Y signal and the digital color difference signals R-Y and B-Y of the given code into a decoding-resultant digital Y signal and decoding-resultant digital color difference signals R-Y and B-Y according to the picture expanding algorithm inverse with respect to the previously-indicated picture compressing algorithm of the JPEG standards. The JPEG encoder/decoder 105 outputs each of the decoding-resultant digital Y signal and the decoding-resultant digital color difference signals R-Y and B-Y to the raster block converter 104 block by block.

During every 1-block period, the raster block converter 104 sequentially writes pieces of each of the decoding-resultant digital Y signal and the decoding-resultant digital color difference signals R-Y and B-Y, which correspond to neighboring 8 by 8 pixels, into corresponding-address storage segments of the memory 103. Thus, during every 1-frame period, 1-frame segments of the decoding-resultant digital Y signal and the decoding-resultant digital color difference signals R-Y and B-Y are provided in the memory 103.

During the playback mode of operation of the apparatus of FIG. 17, pieces of the decoding-resultant digital Y signal and the decoding-resultant digital color difference signals R-Y and B-Y are sequentially read out from the memory 103 in a given order corresponding to the normal scanning direction, and are then fed via the switch 118 to D/A converters 106a within an output section 106. The signal 3fsc fed from the sync signal generator 107 is used as a clock signal for determining a timing of access to the memory 103.

The D/A converters 106a change the decoding-resultant digital Y signal and the decoding-resultant digital color difference signals R-Y and B-Y into a corresponding analog Y signal and corresponding analog color difference signals R-Y and B-Y. The D/A converters 106a output the analog Y signal and the analog color difference signals R-Y and B-Y to a signal processor 106b within the output section 106.

During the playback mode of operation of the apparatus of FIG. 17, the sync signal generator 107 produces a horizontal sync signal and a vertical sync signal which relate to the analog Y signal and the analog color difference signals R-Y and B-Y outputted from the D/A converters 106a. In addition, the sync signal generator 107 produces a signal 3fsc having a frequency equal to three times the frequency of a color subcarrier related to the analog Y signal and the analog color difference signals R-Y and B-Y outputted from the D/A converters 106a. The sync signal generator 107 outputs the horizontal sync signal and the vertical sync signal to the signal processor 106b and a combining device 106c within the output section 106. The sync signal generator 107 outputs the signal 3fsc to the A/D converters 102, the memory 103, the signal processor 106b, and the combining device 106c.

During the playback mode of operation of the apparatus of FIG. 17, the signal processor 106b receives the analog Y signal and the analog color difference signals R-Y and B-Y from the D/A converters 106a. In addition, the signal processor 106b receives the horizontal sync signal and the vertical sync signal from the sync signal generator 107. The signal processor 106b modulates the analog color difference signals R-Y and B-Y, thereby generating a chrominance signal. The signal processor 106b combines or multiplexes the analog Y signal, the chrominance signal, the horizontal sync signal, and the vertical sync signal into a composite video signal of the NTSC format. The signal processor 106b applies the NTSC composite video signal to an output terminal 190. The NTSC composite video signal can be transmitted to an external device via the output terminal 190.

During the playback mode of operation of the apparatus of FIG. 17, the combining device 106c receives the horizontal sync signal, the vertical sync signal, and the signal 3fsc from the sync signal generator 107. The combining device 106c has one input side leading from the sync signal generator 107, and four output sides leading to output terminals 191, 192, 193, and 194 respectively. The combining device 106c mixes the horizontal sync signal, the vertical sync signal, and the signal 3fsc into a composite sync signal corresponding to a black burst signal. The combining device 106c applies the composite sync signal to all the output terminals 191, 192, 193, and 194. The composite sync signal can be further transmitted to external devices via the output terminals 191, 192, 193, and 194.

During a non-recording mode of operation of the apparatus of FIG. 17, the switch 118 disconnects the D/A converters 106a from the memory 103 and connects the D/A converters 106a to the A/D converters 102. Accordingly, the D/A converters 106a receive the digital Y signal and the digital color difference signals R-Y and B-Y from the A/D converters 102. The D/A converters 106a change the digital Y signal and the digital color difference signals R-Y and B-Y into a corresponding analog Y signal and corresponding analog color difference signals R-Y and B-Y. The D/A converters 106a output the analog Y signal and the analog color difference signals R-Y and B-Y to the signal processor 106b.

During the non-recording mode of operation of the apparatus of FIG. 17, the sync signal generator 107 produces a horizontal sync signal and a vertical sync signal which relate to the analog Y signal and the analog color difference signals R-Y and B-Y outputted from the D/A converters 106a. In addition, the sync signal generator 107 produces a signal 3fsc having a frequency equal to three times the frequency of a color subcarrier related to the analog Y signal and the analog color difference signals R-Y and B-Y outputted from the D/A converters 106a. The sync signal generator 107 outputs the horizontal sync signal and the vertical sync signal to the signal processor 106b and the combining device 106c within the output section 106. The sync signal generator 107 outputs the signal 3fsc to the A/D converters 102, the signal processor 106b, and the combining device 106c.

During the non-recording mode of operation of the apparatus of FIG. 17, the signal processor 106b receives the analog Y signal and the analog color difference signals R-Y and B-Y from the D/A converters 106a. In addition, the signal processor 106b receives the horizontal sync signal and the vertical sync signal from the sync signal generator 107. The signal processor 106b modulates the analog color difference signals R-Y and B-Y, thereby generating a chrominance signal. The signal processor 106b combines or multiplexes the analog Y signal, the chrominance signal, the horizontal sync signal, and the vertical sync signal into a composite video signal of the NTSC format. The signal processor 106b applies the NTSC composite video signal to the output terminal 190. The NTSC composite video signal can be transmitted to an external device via the output terminal 190.

During the non-recording mode of operation 6f the apparatus of FIG. 17, the combining device 106c receives the horizontal sync signal, the vertical sync signal, and the signal 3fsc from the sync signal generator 107. The combining device 106c mixes the horizontal sync signal, the vertical sync signal, and the signal 3fsc into a composite sync signal corresponding to a black burst signal. The combining device 106c applies the composite sync signal to all the output terminals 191, 192, 193, and 194. The composite sync signal can be further transmitted to external devices via the output terminals 191, 192, 193, and 194.

The output section 106 includes the D/A converters 106a, the signal processor 106b, the combining device 106c, the input terminals 182, 183, and 184, and the output terminals 190, 191, 192, 193, and 194. It should be noted that the output section 106 may be omitted from the apparatus of FIG. 17.

The input section 101 is similar in structure and operation to the input section 1 in FIGS. 1 and 2. The JPEG encoder/decoder 105 is similar in structure and operation to the JPEG encoder/decoder 5 in FIGS. 1 and 3. The sync signal generator 107 is similar in structure and operation to the sync signal generator 7 in FIGS. 1 and 19.

As previously described, the JPEG encoder/decoder 105 compresses the output signal of the raster block converter 104 during the compression recording mode of operation of the apparatus of FIG. 17. In the case where an input video signal is of the NTSC format, the output signal of the raster block converter 104 has a transmission data rate of about 18.42M bytes per second.

It is preferable that the JPEG encoder/decoder 105 compresses the output signal of the raster block converter 104 into a transmission data rate of about 0.92M bytes per second. Portions of the output signal of the raster block converter 104 which correspond to alternate fields may be discarded. In this case, the output signal of the raster block converter 104 is preferably compressed into a transmission data rate of about 0.46M bytes per second.

Figure 18:
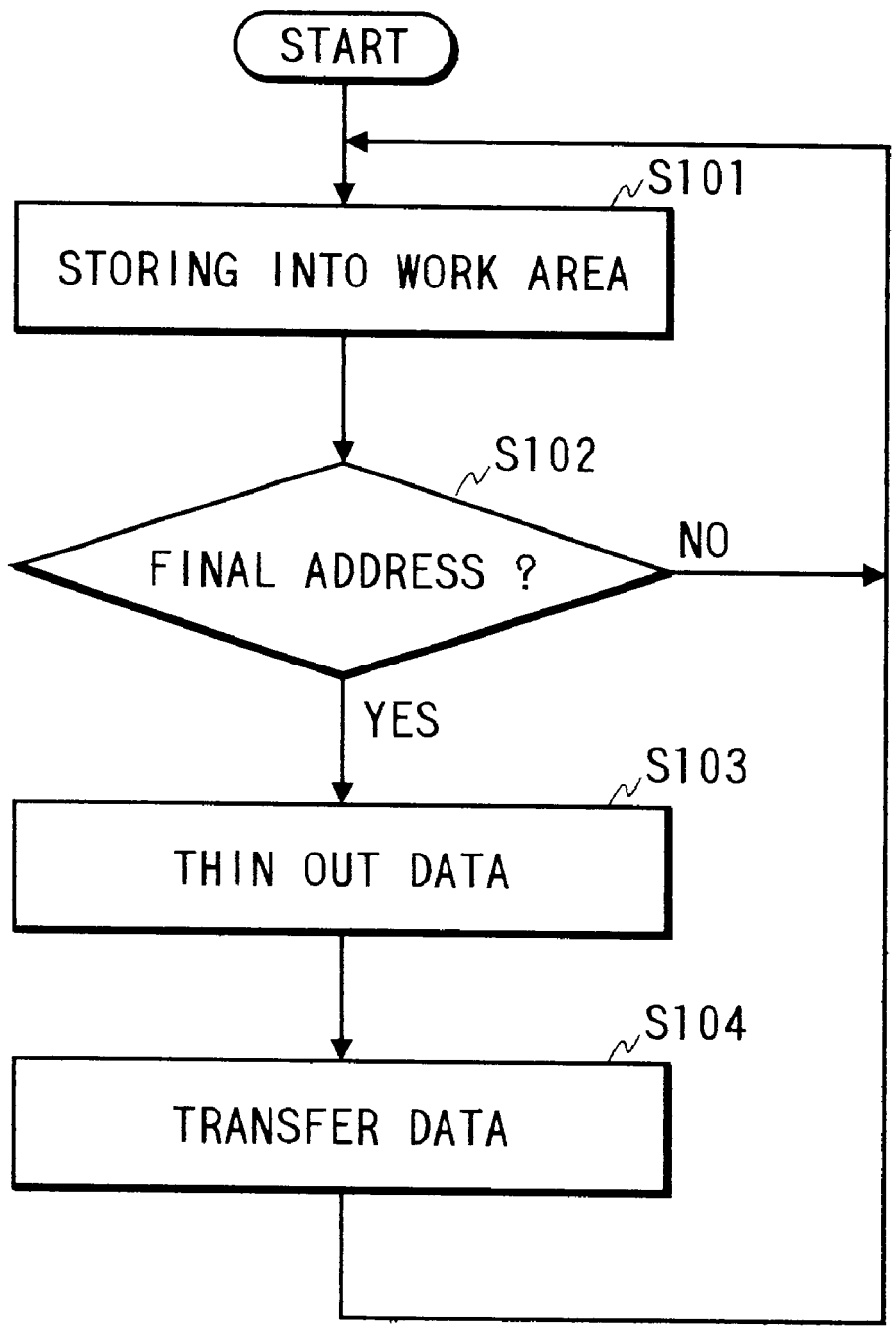
FIG. 18 is a flowchart of a segment of a program for controlling a CPU in FIG. 17.

As previously described, the CPU 108 operates in accordance with a program stored in the ROM 112. FIG. 18 is a flowchart of a segment of the program which is executed during the compression recording mode of operation of the apparatus of FIG. 17.

As shown in FIG. 18, a first step S101 of the first program segment stores the output signal of the JPEG encoder/decoder 5 into a work area in the recording medium within the storage unit 111 via the bus line 109 and the interface 110.

A step S102 following the step S101 decides whether or not the currently-accessed address in the work area reaches a final address. When the currently-accessed address in the work area reaches the final address, the program advances from the step S102 to a step S103. Otherwise, the program returns from the step S102 to the step S101.

The step S103 thins out the signal in the work area in unit of frame or field to further compress the signal. Specifically, only portions of the signal in the work area are made usable while the remaining portions thereof are discarded.

A step S104 following the step S103 controls the storage units 111 and 117 so that the thinning-resultant signal is transferred from the storage unit 111 to the storage unit 117. Thus, the thinning-resultant signal is stored into the recording medium within the storage unit 117. After the step S104, the program returns to the step S101.

Each time the step S101 is executed, the currently-accessed address in the work area is updated. After the currently-accessed address in the work area reaches the final address, the currently-accessed address is updated and returned to a first address (a start or head address).

It should be noted that the thinning-resultant signal may be stored into a saving area in the recording medium within the storage unit 111.

Sixth Embodiment

Figure 20:
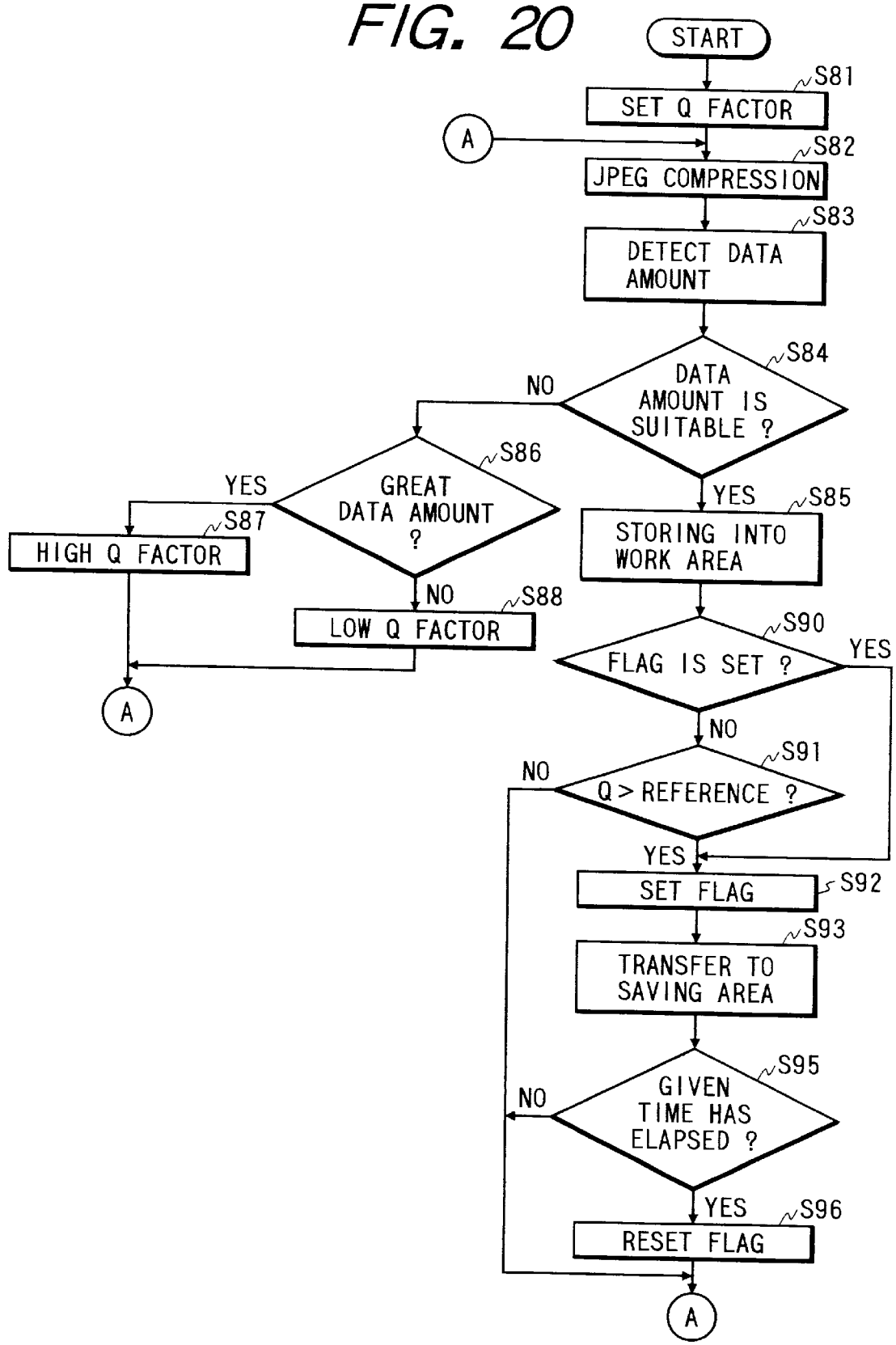
FIG. 20 is a flowchart of a segment of a program for controlling a CPU in a video signal recording and reproducing apparatus according to a sixth embodiment of this invention.

A sixth embodiment of this invention is similar to the embodiment of FIGS. 1–10 except for design changes indicated later. In the sixth embodiment, a CPU 8 (see FIG. 1) operates in accordance with a program stored in a ROM 12 (see FIG. 1). FIG. 20 is a flowchart of a segment of the program which is executed during a compression recording mode of operation of an apparatus in the sixth embodiment. The program segment in FIG. 20 replaces the program segments in FIGS. 5, 7, and 10.

As shown in FIG. 20, a first step S81 of the program segment sets or initializes a Q factor. Generally, the set Q factor is equal to a Q factor used during the signal processing related to an immediately-preceding frame or an immediately-preceding field. After the step S81, the program advances to a step S82.

The step S82 enables a JPEG encoder/decoder 5 (see FIG. 1) to compress the output signal of the raster block converter 4 in response to the Q factor. A step S83 following the step S82 detects the number of bits in the signal outputted from the JPEG encoder/decoder 5 to a bus line 9 (see FIG. 1) during every unit period. The step S83 corresponds to the step S11 in FIG. 5.

A step S84 following the step S83 decides whether or not the detected number of bits per unit period is in a given range corresponding to a suitable range or an acceptable range. When the detected number of bits per unit period is in the given range, the program advances from the step S84 to a step S85. Otherwise, the program advances from the step S84 to a step S86.

The step 386 decides whether or not the detected number of bits per unit period is greater than a predetermined reference number. When the detected number of bits per unit period is greater than the predetermined reference number, the program advances from the step S86 to a step S87. Otherwise, the program advances from the step S86 to a step S88. The step S87 increases the Q factor to provide a higher rate of the data compression by the JPEG encoder/decoder 5. After the step S87, the program returns to the step S82. On the other hand, the step S88 decreases the Q factor to provide a lower rate of the data compression by the JPEG encoder/decoder 5. After the step S88, the program returns to the step S82. The steps S86, S87, and S88 correspond to the step S12 in FIG. 5.

The step S85 stores the output signal of the JPEG encoder/decoder 5 into a work area in a RAM 13 (see FIG. 1) via the bus line 9. Alternatively, the output signal of the JPEG encoder/decoder 5 may be stored into a work area in the recording medium within a storage unit 11 (see FIG. 1) via the bus line 9 and an interface 10 (see FIG. 1).

A step S90 following the step S85 decides whether or not a recording flag is set. When the recording flag is set, the program jumps from the step S90 to a step S92. Otherwise, the program advances from the step S90 to a step S91.

The step S91 decides whether or not the Q factor is greater than a predetermined reference value. When the Q factor is greater than the predetermined reference value, the program advances from the step S91 to the step S92. Otherwise, the program returns from the step S91 to the step S82.

The step S92 sets the recording flag. A step S93 following the step S92 transfers the stored signal from the work area in the RAM 13 to a saving area in the recording medium within the storage unit 11 via the bus line 9 and the interface 10. In the case where the work area in the recording medium within the storage unit 11 is used instead of the work area in the RAM 13, the stored signal is transferred from the work area in the recording medium within the storage unit 11 to the saving area therein. The step S93 stores the transferred signal into the saving area in the recording medium within the storage unit 11.

A step S95 subsequent to the step S93 decides whether or not a given time interval T0 has elapsed since the moment at which the Q factor exceeded the predetermined reference value. When the given time interval T0 has elapsed, the program advances from the step S95 to a step S96. Otherwise, the program returns from the step S95 to the step S82. The given time interval T0 is equal to, for example, several seconds.

The step S96 resets the recording flag. After the step S96, the program returns to the step S82.

It is preferable that the signal stored into the saving area in the recording medium within the storage unit 11 by the iteration of the execution of the step S93 corresponds to the given time interval T0 after the moment of the occurrence of the increase in the Q factor above the predetermined reference value, and also the given time interval T0 before the moment of the occurrence of the increase in the Q factor above the predetermined reference value.

The steps S90, S91, S92, S93, S95, and S96 enable the following process. In the case where the Q factor exceeds the predetermined reference value, the output signal of the JPEG encoder/decoder 5 which corresponds to a time interval containing the moment of the occurrence of the increase in in the Q factor above the predetermined reference value is stored into the saving area in the recording medium within the storage unit 11. Under certain conditions, an increase in the Q factor above the predetermined reference value means that the images represented by the output signal of the JPEG encoder/decoder 5 have quickly moving portions.

What is claimed is:

1. A video signal recording apparatus comprising:

first means for compressing a first video signal into a second video signal in response to a fixed quantization factor which determines a degree of compression;

second means for detecting a rate of a time-domain variation in a data rate of the second video signal;

third means for deciding whether or not the detected rate of the time-domain variation is greater than a reference rate;

a recording medium: and fourth means for recording the second video signal on the recoding medium when the third means decides that the detected rate of the time-domain variation is greater than the reference rate;

wherein the second means and the third means comprise means for detecting first values of the data rate which occur at respective moments spaced by first equal intervals, means for calculating a first average among the first values, means for detecting second values of the data rate which occur at respective moments spaced by second equal intervals longer than the first equal intervals, means for calculating a second average among the second values, and means for deciding whether or not the detected rate of the time-domain variation is greater than the reference rate in response to a relation between the first average value and the second average value.

* * * * *